(12) United States Patent
Fu

(10) Patent No.: US 8,783,491 B2
(45) Date of Patent: Jul. 22, 2014

(54) WASHING CONTAINER ASSEMBLY

(71) Applicant: Shih-Chin Fu, Pingtung County (TW)

(72) Inventor: Shih-Chin Fu, Pingtung County (TW)

( * ) Notice: Subject to any disclaimer, the term of this patent is extended or adjusted under 35 U.S.C. 154(b) by 0 days.

(21) Appl. No.: 13/905,355

(22) Filed: May 30, 2013

(65) Prior Publication Data
US 2013/0320008 A1 Dec. 5, 2013

(30) Foreign Application Priority Data

Jun. 1, 2012 (TW) .............................. 101210620 U

(51) Int. Cl.
*B08B 13/00* (2006.01)
*A47J 43/24* (2006.01)
(52) U.S. Cl.
CPC . *B08B 13/00* (2013.01); *A47J 43/24* (2013.01)
USPC ...................................................... 220/23.89
(58) Field of Classification Search
CPC .................................. A47J 43/24; A47L 17/02
USPC ............. 220/23.89, 23.87, 23.83, 676, 367.1, 220/571.1, 571, 574.2, 572, 328, 327, 325, 220/324, 315
IPC .................................... A47J 43/24; A47L 17/02
See application file for complete search history.

(56) References Cited

U.S. PATENT DOCUMENTS

| | | | | |
|---|---|---|---|---|
| 1,519,510 A | * | 12/1924 | Santarsiero | 99/416 |
| 2,040,004 A | * | 5/1936 | Kelsay | 126/369 |
| 4,319,679 A | * | 3/1982 | Gustafsson | 206/0.5 |
| 6,622,618 B1 | * | 9/2003 | Glucksman et al. | 99/495 |
| 7,422,120 B1 | * | 9/2008 | Fried | 210/464 |
| 2008/0188365 A1 | * | 8/2008 | Dalla Piazza et al. | 494/84 |
| 2012/0174798 A1 | * | 7/2012 | Kulikowski | 99/340 |

FOREIGN PATENT DOCUMENTS

| | | | | | |
|---|---|---|---|---|---|
| FR | 558724 A | * | 9/1923 | | A47L 17/02 |
| GB | 990342 A | * | 4/1965 | | A47J 43/24 |
| GB | 2369589 A | * | 6/2002 | | A47J 43/24 |
| TW | M417893 U1 | | 12/2011 | | |

* cited by examiner

*Primary Examiner* — Robert J Hicks
(74) *Attorney, Agent, or Firm* — McNees Wallace & Nurick LLC

(57) ABSTRACT

A washing container assembly for washing an article includes an outer container, a perforated inner container, and a perforated and dish-shaped lid. The outer container has a first top opening and a first compartment in spatial communication with the first top opening. The perforated inner container is coupled removably to the outer container, and defines a second opening and a second compartment that is in spatial communication with the second top opening and that is for receiving the article therein. The lid includes a peripheral wall connected removably to the first and second top portions of the outer and inner containers, and a depressed wall extending from the peripheral wall into the second compartment and for maintaining the article in the second compartment.

1 Claim, 39 Drawing Sheets

US 8,783,491 B2

WASHING CONTAINER ASSEMBLY

CROSS-REFERENCE TO RELATED APPLICATIONS

This application claims priority of Taiwanese Application No. 101210620, filed on Jun. 1, 2012.

BACKGROUND OF THE INVENTION

1. Field of the Invention

This invention relates to a washing container assembly, more particularly to a washing container assembly capable of maintaining an article therein when the article is being washed.

2. Description of the Related Art

Referring to FIG. 1, Taiwanese Utility Model No. M417893 discloses a conventional washing container assembly 1 including an outer container 11 and a perforated inner container 12. The outer container 11 has a top portion 110 defining a first top opening 112 and a main portion 111 defining a first compartment 113 that is in spatial communication with the first top opening 112. The main portion 111 is formed with a plurality of angularly spaced-apart through holes 114 adjacent to the top portion 110.

The perforated inner container 12 has a main portion 121 defining a second compartment 122 within the first compartment 113 and a flange 124 defining a second top opening 123. The main portion 121 of the perforated inner container 12 is formed with a plurality of through holes 125. The second compartment 122 is in spatial communication with the second top opening 123 and is for receiving an article therein.

By this way, dirt on the article can be washed away when the first and second compartments 113, 122 are filled with water, and can be moved out of the outer container 11 with the flow of water via the through holes 125, 114 upon the pouring of water into the second compartment 122.

However, the article being washed may float on the water (i.e., only a portion of the article is immersed in the water) which results in a relatively low washing efficiency. When the water level in the second compartment 122 is high, the article may even drift out of the second compartment 122 before being thoroughly washed.

SUMMARY OF THE INVENTION

The object of the present invention is to provide a washing container assembly capable of alleviating the abovementioned drawbacks of the prior art.

According to this invention, the washing container assembly for washing an article comprises an outer container, a perforated inner container, and a perforated and dish-shaped lid. The outer container has a top portion that defines a first top opening and defines a first compartment that is in spatial communication with the first top opening. The perforated inner container has a top portion that defines a second top opening, is coupled removably to the outer container, and defines a second compartment that is within the first compartment, that is in spatial communication with the second top opening, and that is adapted for receiving the article therein. The perforated and dish-shaped lid includes a peripheral wall that is connected removably to the first and second top portions of the outer and inner containers, and a depressed wall that extends from the peripheral wall into the second compartment and that is adapted for maintaining the article in the second compartment.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
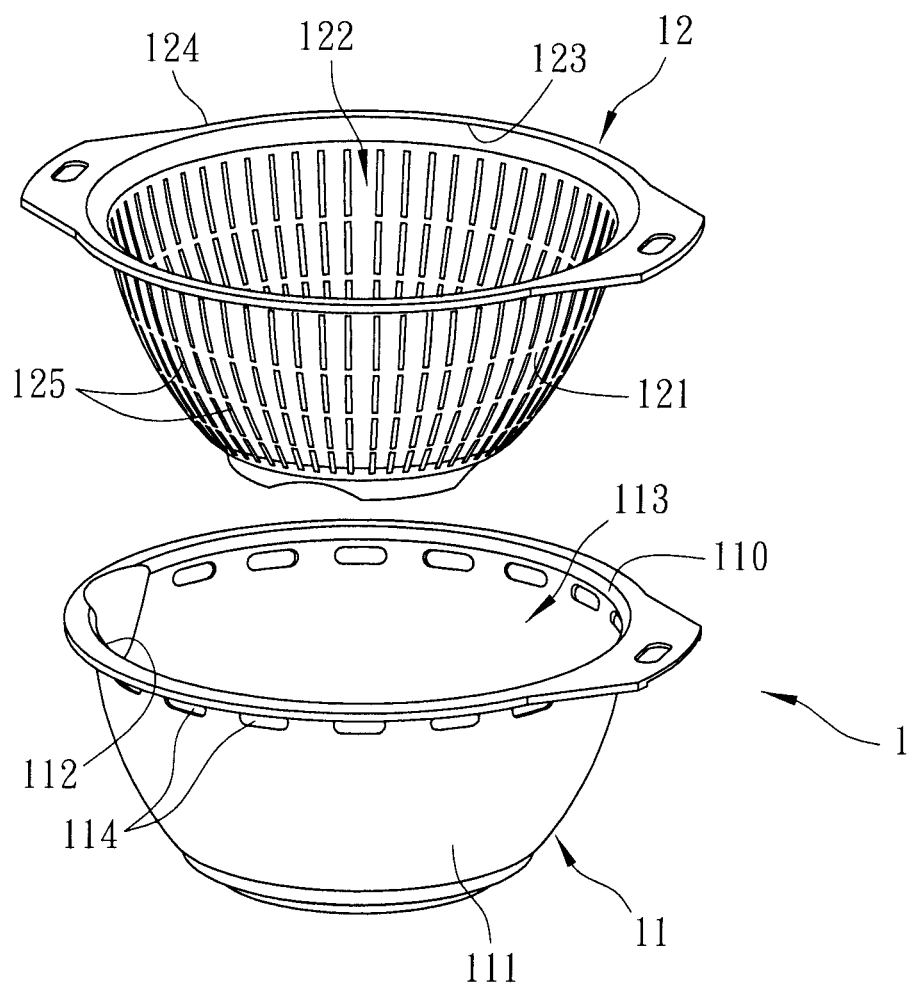
FIG. 1 illustrates a conventional washing container assembly disclosed in Taiwanese Utility Model No. M417893.
Figure 2:
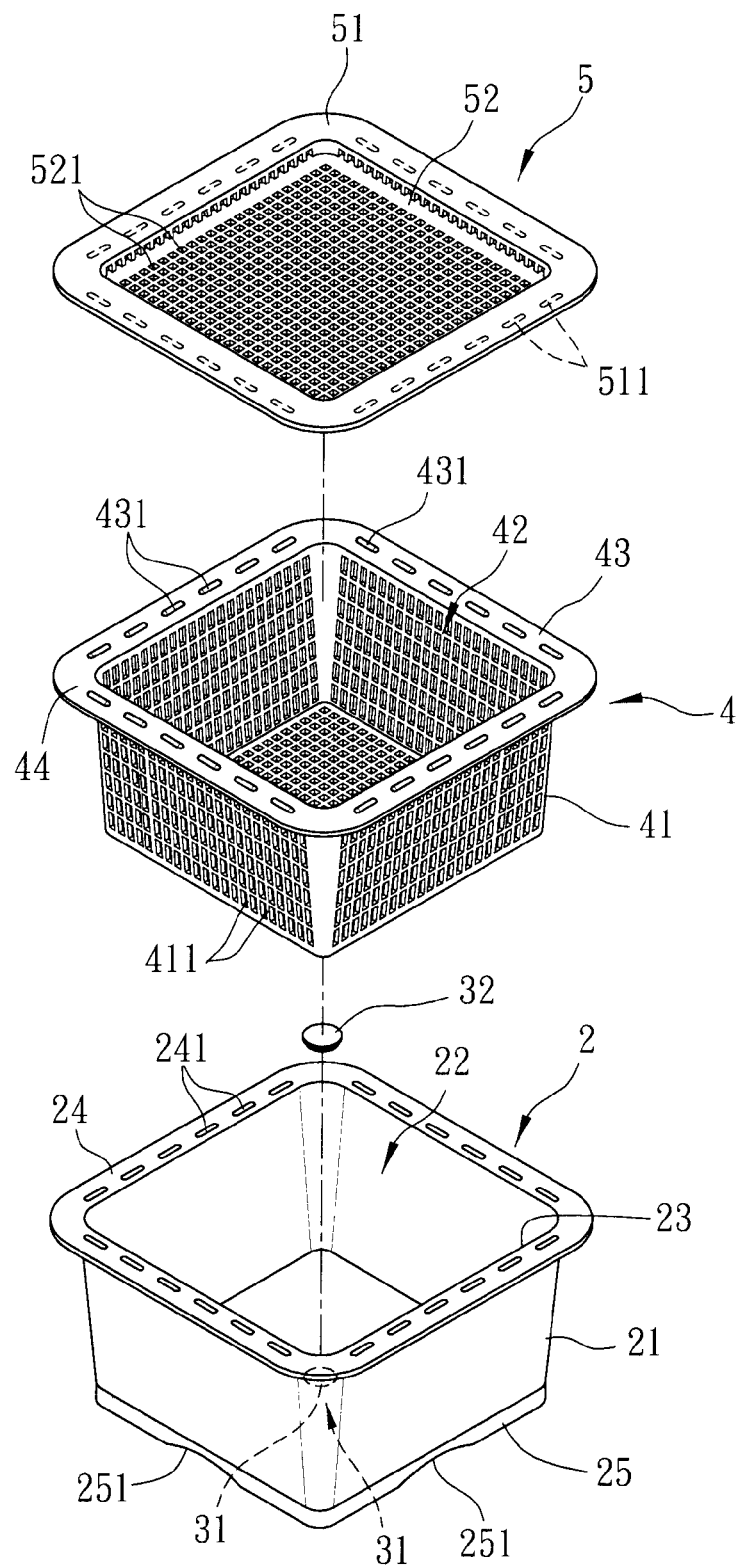
FIG. 2 is an exploded perspective view of a first preferred embodiment of a washing container assembly according to the present invention.

Referring to FIG. 2, the first preferred embodiment of a washing container assembly for washing articles 9 (see FIG. 3) according to the present invention comprises an outer container 2, a perforated inner container 4, and a perforated and dish-shaped lid 5.

The outer container 2 has a main portion 21 defining a first compartment 22, and a top portion configured as a flange 24 and defining a first top opening 23 that is in spatial communication with the first compartment 22. The main portion 21 has a valve 3 formed in a bottom part thereof such that the main portion 21 is operable to fluidly communicate the first compartment 22 to the ambient. The flange 24 protrudes from a top end of the main portion 21 away from the first top opening 23.

The perforated inner container 4 is coupled removably to the outer container 2, and has a main portion 41 defining a second compartment 42 within the first compartment 22 and a top portion configured as a flange 43 and defining a second top opening 44. The main portion 41 is formed with a plurality of rectangular through holes 411. The second compartment 42 is in spatial communication with the second top opening 44 and is for receiving the articles 9 therein. The flange 43 of the perforated inner container 4 is disposed removably on the flange 24 of the outer container 2, and protrudes from a top end of the main portion 41 away from the second top opening 44.

The perforated and dish-shaped lid 5 is coupled removably to the perforated inner container 4 and includes a peripheral wall 51 and a depressed wall 52. The peripheral wall 51 is disposed removably on the flanges 43, 24. The depressed wall 52 is formed with a plurality of through holes 521, extends from the peripheral wall 51 into the second compartment 42 (i.e., the main portion 41 of the perforated inner container 4 and the depressed wall 52 of the lid 5 are received in the main portion 21 of the outer container 2), and is for maintaining the articles 9 in the second compartment 42.

The flange 43 of the perforated inner container 4 is formed with a plurality of first attaching members and a plurality of first attaching components. The peripheral wall 51 of the lid 5 is formed with a plurality of second attaching members engaging respectively and removably the first attaching members of the flange 43 of the perforated inner container 4. The flange 24 of the outer container 2 is formed with a plurality of third attaching members engaging respectively and removably the first attaching components of the flange 43 of the perforated inner container 4.

Figure 3:
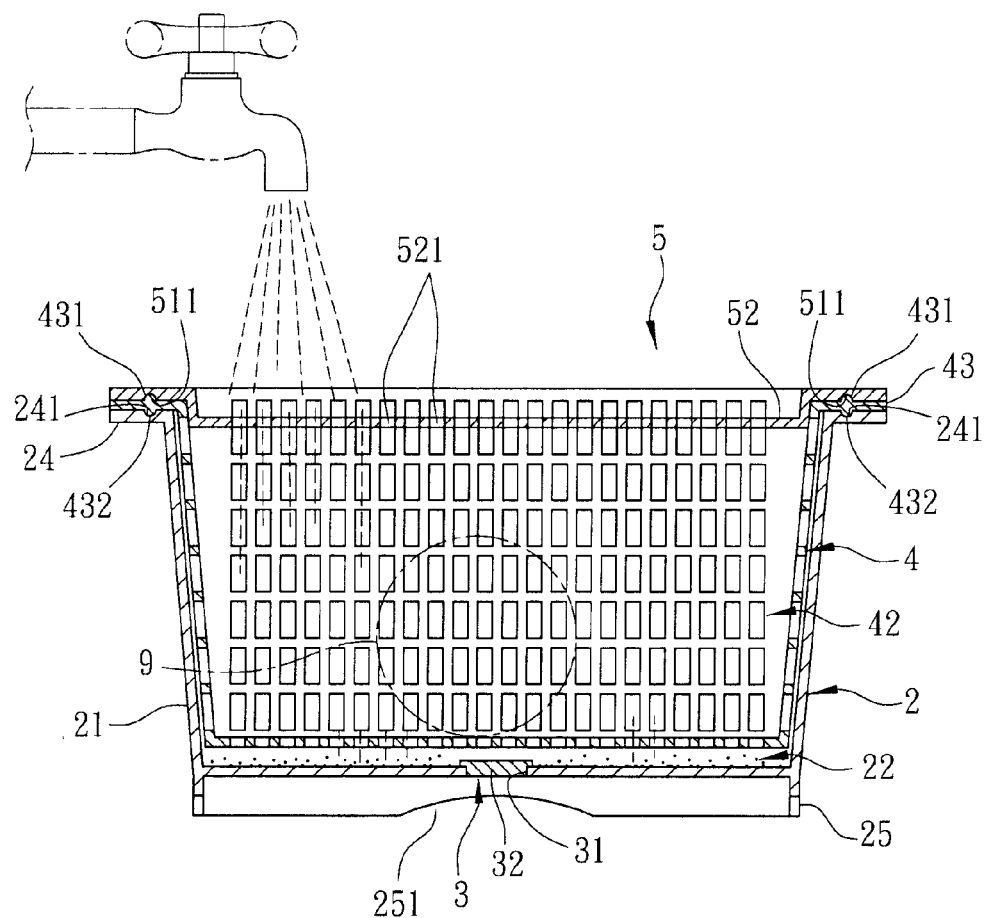
FIG. 3 is a schematic sectional view of the first preferred embodiment, illustrating an outer container, a perforated inner container, and a perforated and dish-shaped lid of the washing container assembly being secured together by a plurality of attaching members.

Further referring to FIG. 3, in this embodiment, each of the first attaching members is configured as a protrusion 431 protruding from the flange 43 of the perforated inner container 4 toward the peripheral wall 51 of the lid 5, each of the first attaching components is configured as a protrusion 432 protruding from the flange 43 toward the flange 24 of the outer container 2, and the second and third attaching members are configured as grooves 511, 241. In this embodiment, the depressed wall 52 of the lid 5, the main portion 41 of the perforated inner container 4 and the main portion 21 of the outer container 2 are configured to be substantially rectangular.

In this embodiment, the valve 3 includes a valve hole 31 formed in the bottom part of the main portion 21 of the outer container 2 and a plug 32 engageable with the valve hole 31. The outer container 2 further has a standing wall portion 25 that is connected to a bottom end of the main portion 21 for spacing the main portion 21 apart from a supporting surface on which the washing container assembly is placed, and that is formed with a plurality of drain holes 251 communicating fluidly the through hole 32 when the plug 32 is removed.

When it is desired to wash the articles 9, the valve hole 31 is closed by the plug 32 and the lid 5 is detached from the perforated inner container 4 and the outer container 2. After the articles 9 are placed in the second compartment 42, the lid 5 is placed on the perforated inner container 4 with the grooves 511 being engaged respectively with the protrusions 431. Thereafter, cleansing liquid such as water is filled in the first and second compartments 22, 42, and the washing container assembly is shaken back and forth so as to wash the articles 9. To facilitate washing of the articles 9, a user can remove the lid 5 temporarily and manually wash specific parts of the articles 9 during the abovementioned washing process.

After shaking the washing container assembly, the perforated inner container 4 and the lid 5 can be kept on the outer container 2 for a period of time, such that the dirt washed away from the articles 9 having a relatively large density would flow through the through holes 411 of the perforated inner container 4 and settle down on the bottom wall of the main body 21 of the outer container 2, and the dirt having a relatively small density flows through the through holes 521 into the compartment defined by the depressed wall 52 so as to be removed from the washing container assembly. The plug 32 can then be removed and the settled dirt is discharged together with a small amount of water from the first compartment 22 via the valve hole 31 and the drain holes 251 to the ambient. After removal of the washed articles 9, the remaining water in the outer container 2 can be reused for washing other articles.

Figure 4:
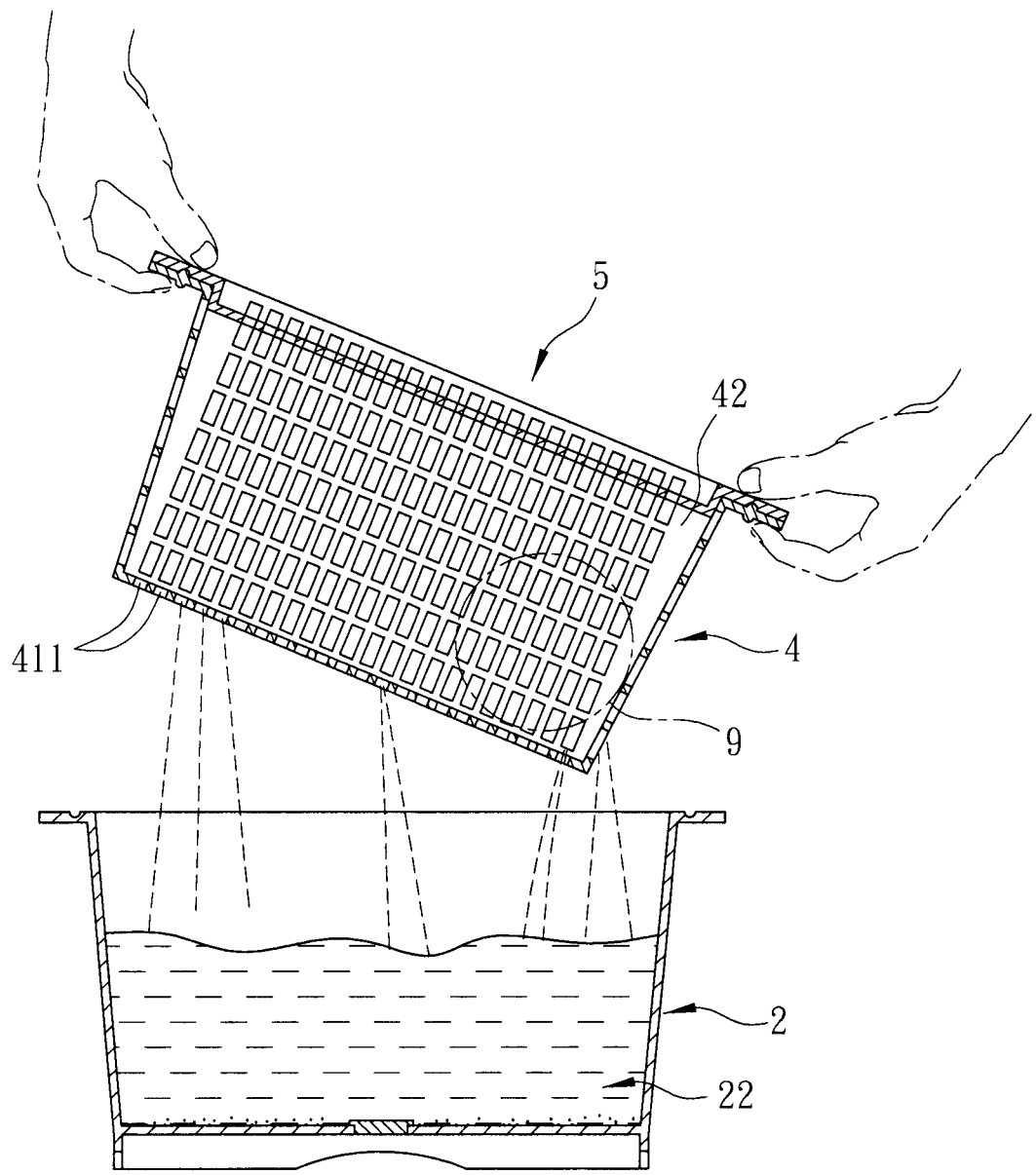
FIG. 4 is another schematic sectional view of the first preferred embodiment, illustrating the perforated inner container and the lid being separated from the outer container.
Figure 5:
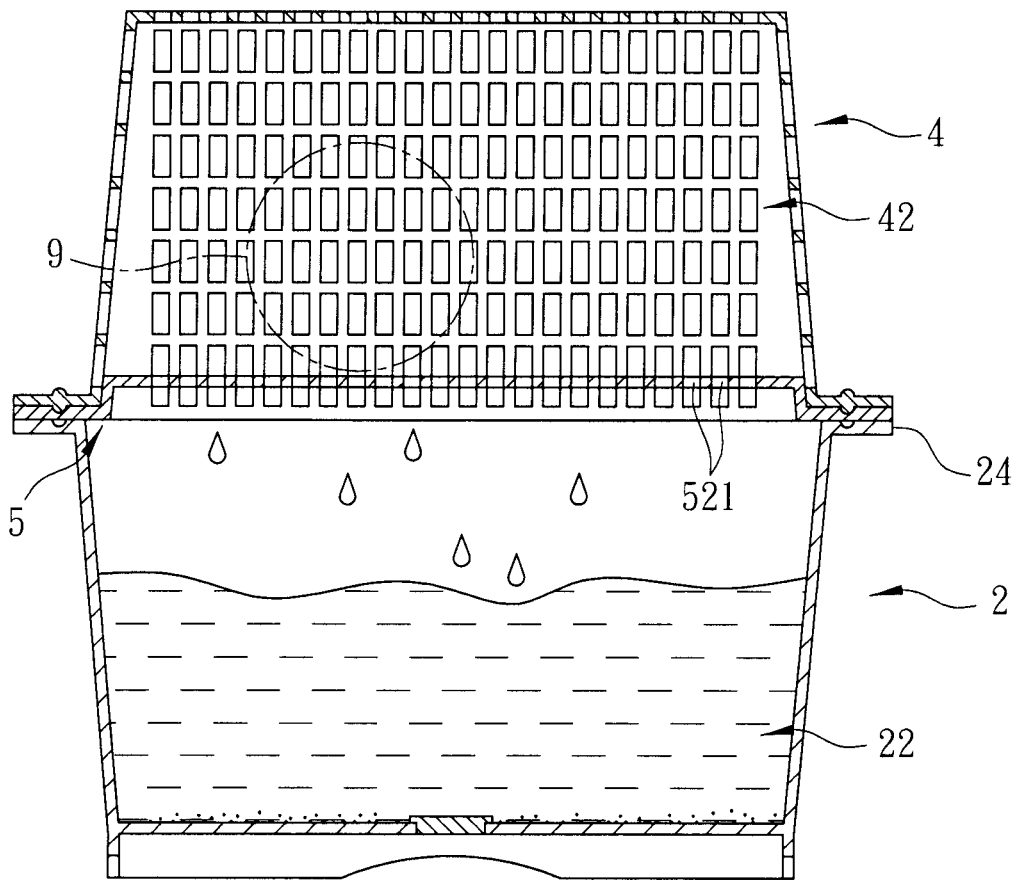
FIG. 5 is a schematic sectional view of the first preferred embodiment, illustrating the lid and the perforated inner container being disposed upside down on the outer container.

As shown in FIG. 5, after washing the articles 9, the perforated inner container 4 and the lid 5 can be lifted and turned upside down on the flange 24 of the outer container 2 such that water in the second compartment 42 flows out of the second compartment 42 via the through holes 521 of the lid 5 and the through holes 411 of the perforated inner container 4, and that the articles 9 in the second compartment 42 can be drained. Alternatively, referring to FIG. 4, the perforated inner container 4 and the lid 5 can be removed from the outer container 2 and be further shaken back and forth so as to further quickly drain the water in the second compartment 42 via the through holes 411 of the perforated inner container 4.

Figure 6:
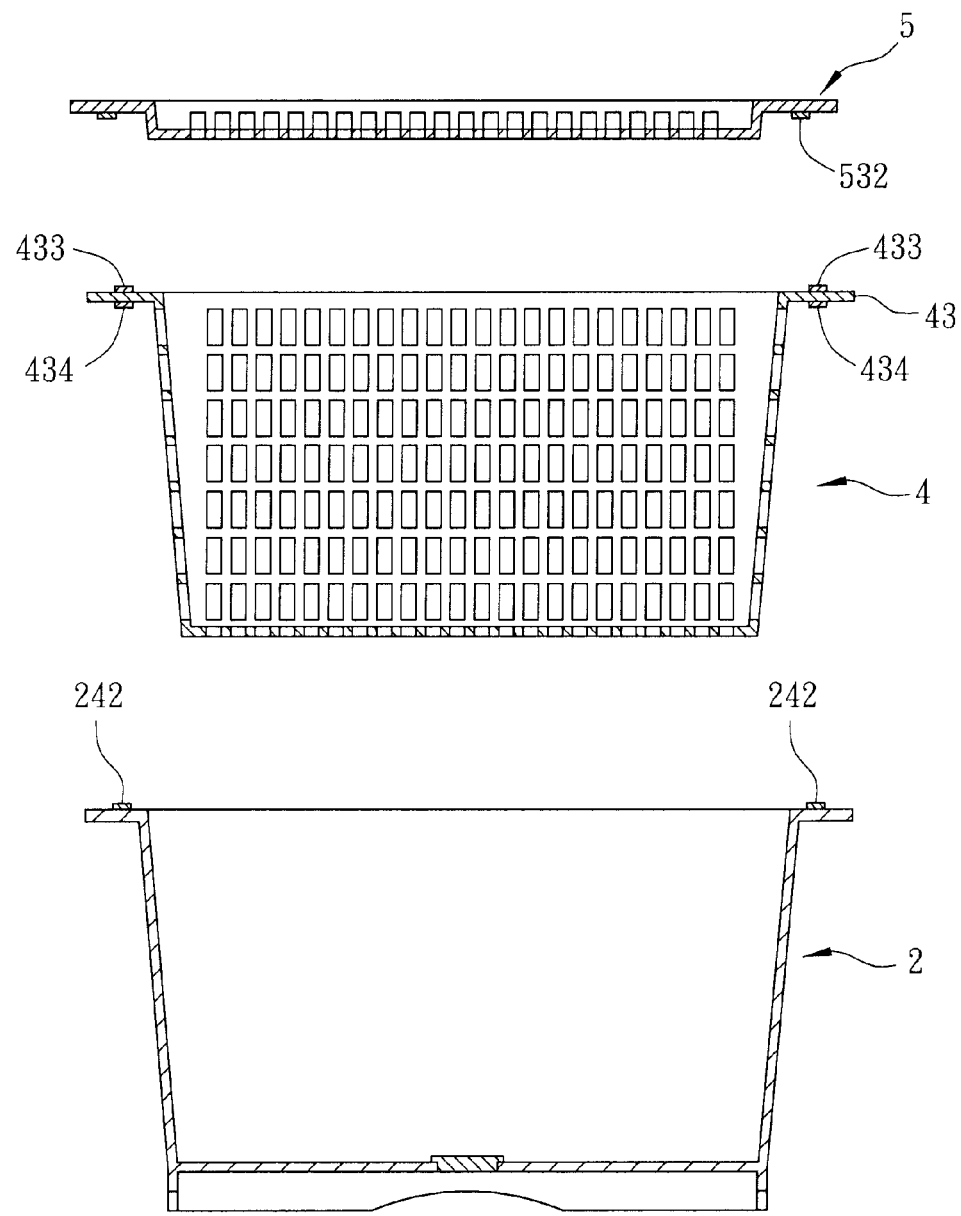
FIG. 6 is an exploded schematic sectional view of the first preferred embodiment, in which attaching members and attaching components that connect the lid, the perforated inner container and the outer container together are configured as magnetic components.

It is noted that the configurations of the first, second and third attaching members and the first attaching components are not limited to the abovementioned aspect. For example, referring to FIG. 6, each of the first attaching members and the first attaching components may be configured as a first magnetic component 433, 434, each of the second attaching members may be configured as a second magnetic component 532 coupled removably to a respective one of the first magnetic components 433, and each of the third attaching members may be configured as a third magnetic component 242 coupled removably to a respective one of the first magnetic components 434.

Figure 7A:
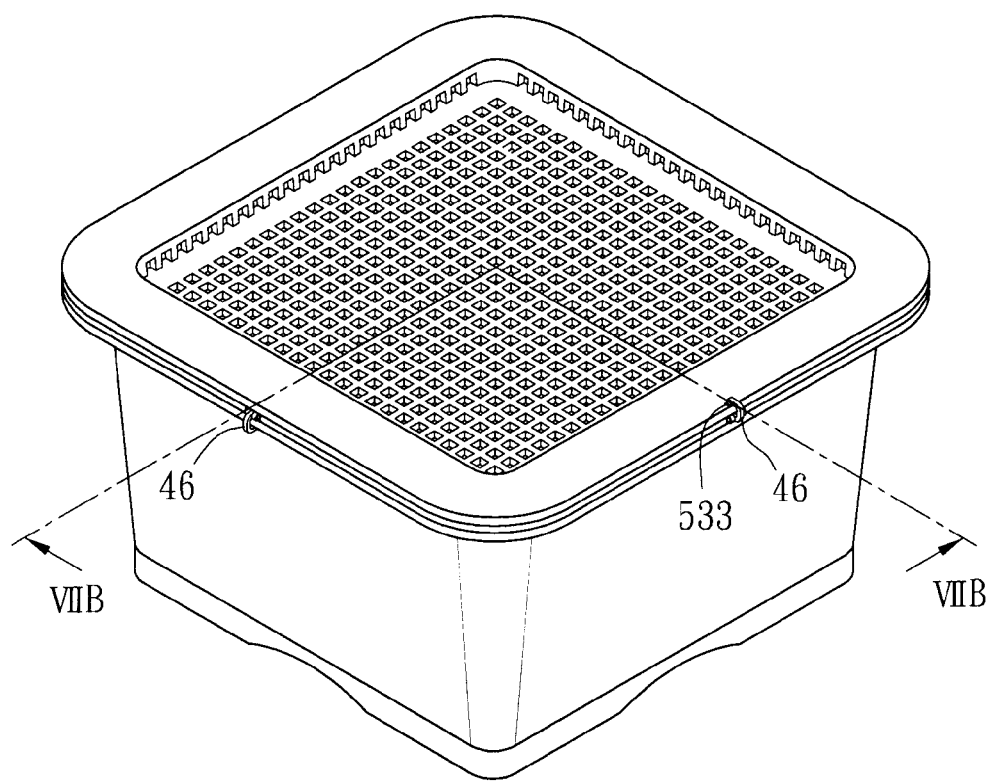
FIG. 7A is a perspective view of the first preferred embodiment, in which the attaching members formed in the lid and the outer container are configured as furrows and the attaching members provided on the perforated inner container are configured as hooks.
Figure 7B:
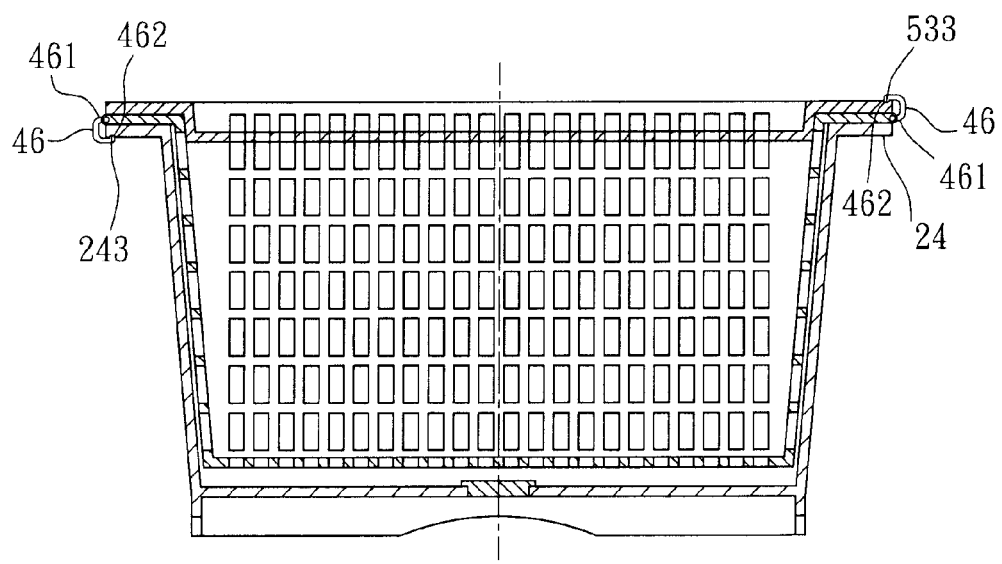
FIG. 7B is a sectional view taken along a line VIIB-VIIB in FIG. 7A.
Figure 8:
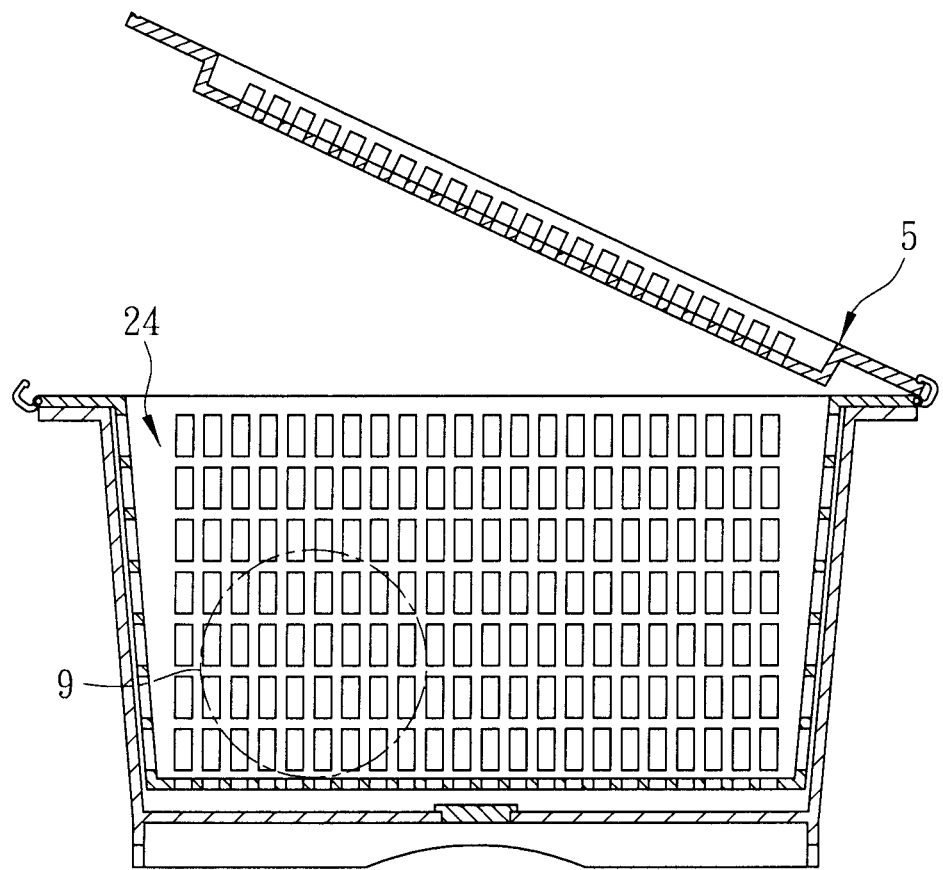
FIG. 8 is a sectional view of the first preferred embodiment, in which one end of the lid is lifted.

Alternatively, as shown in FIGS. 7A, 7B and 8, the second and third attaching members may be configured as furrows 533, 243, and the first attaching members and the first attaching components are configured as hooks 46 each having a first end 461 that is pivotally connected to the flange 43 of the perforated inner container 4 and a second end 462 that engages a corresponding one of the furrows 533, 243.

Figure 9A:
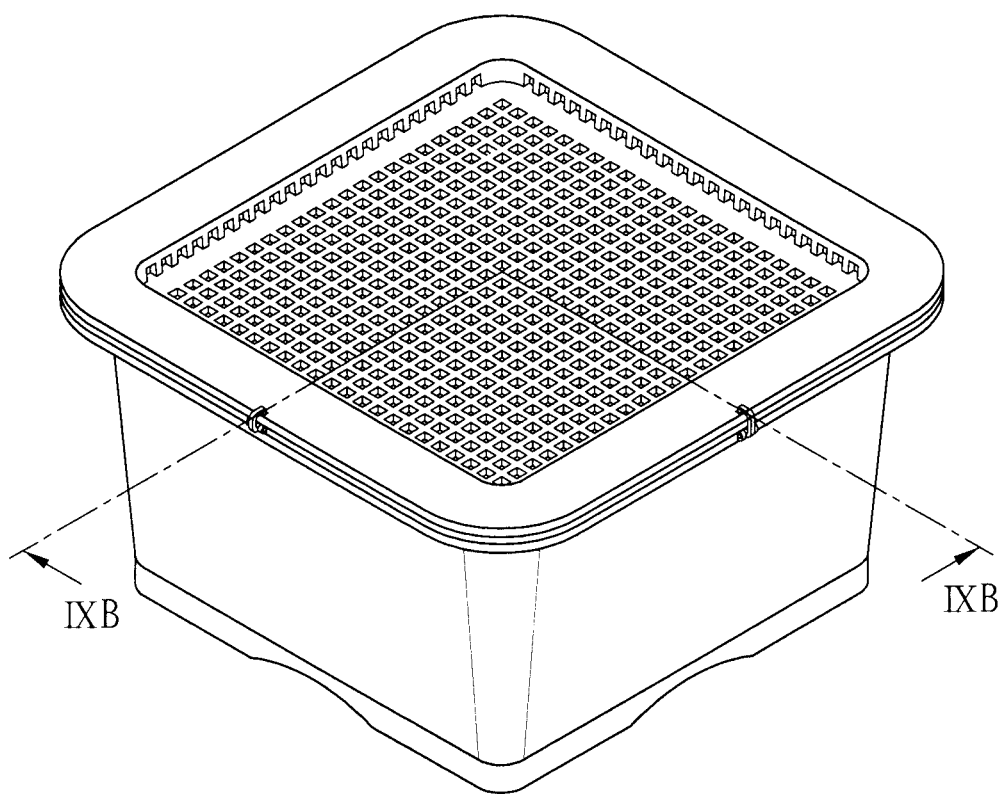
FIG. 9A is another perspective view of the first preferred embodiment, in which the attaching members formed in the lid are configured as furrows and the attaching members provided on the perforated inner container and the outer container are configured as hooks.
Figure 9B:
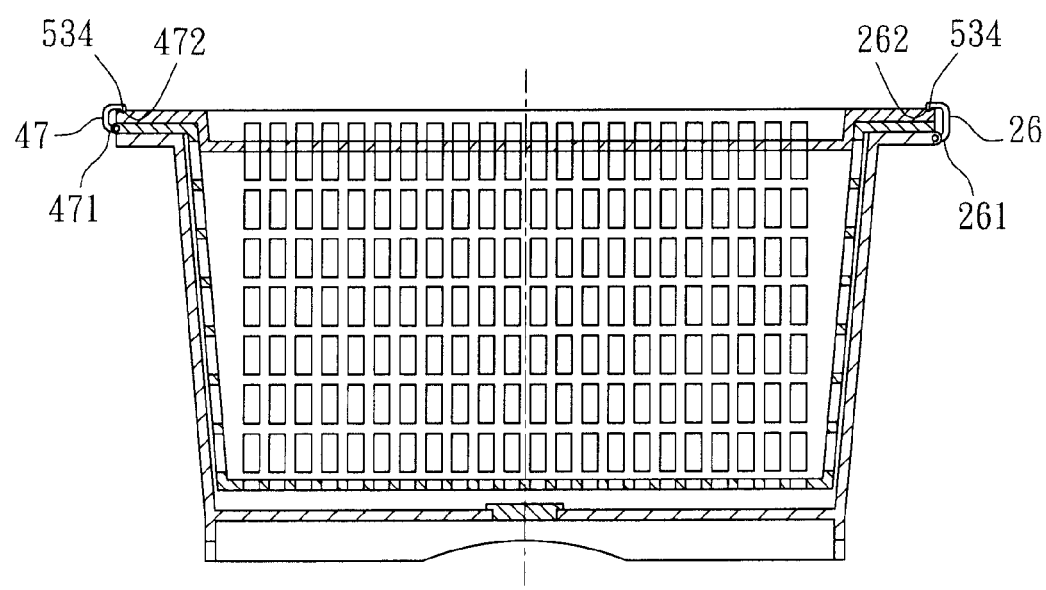
FIG. 9B is a sectional view taken along a line IXB-IXB in FIG. 9A.

Another modification of the coupling mechanism among the outer container 2, the perforated inner container 4 and the lid 5 is shown in FIGS. 9A and 9B. In this aspect, the peripheral wall 51 of the lid 5 is formed with furrows 534. The flange 43 of the perforated inner container 4 is provided with hooks 47 each having a first end 471 that is pivotally connected to the flange 43 and a second end 472 that engages removably a corresponding one of the furrows 534. The flange 24 of the outer container 2 is provided with hooks 26 each having a first end 261 that is pivotally connected to the flange 24 of the outer container 2 and a second end 262 that engages removably a corresponding one of the furrows 534.

Figure 10:
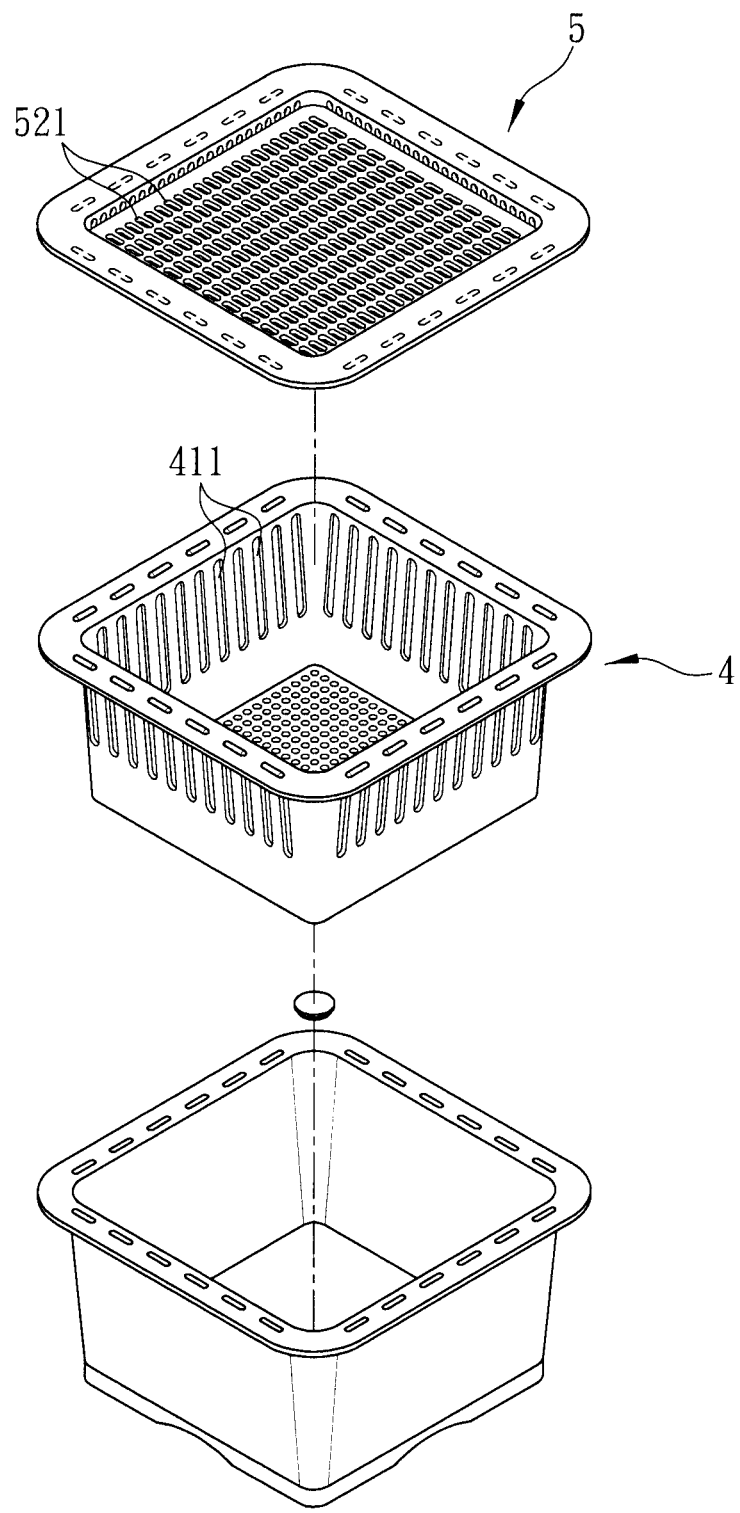
FIG. 10 is another exploded perspective view of the first preferred embodiment, illustrating the perforated inner container and the lid having elliptical through holes.

In addition, as shown in FIG. 10, the through holes 411 of the perforated inner container 4 and the through holes 521 of the lid 5 may be elliptical in other embodiments of this invention.

Figure 11:
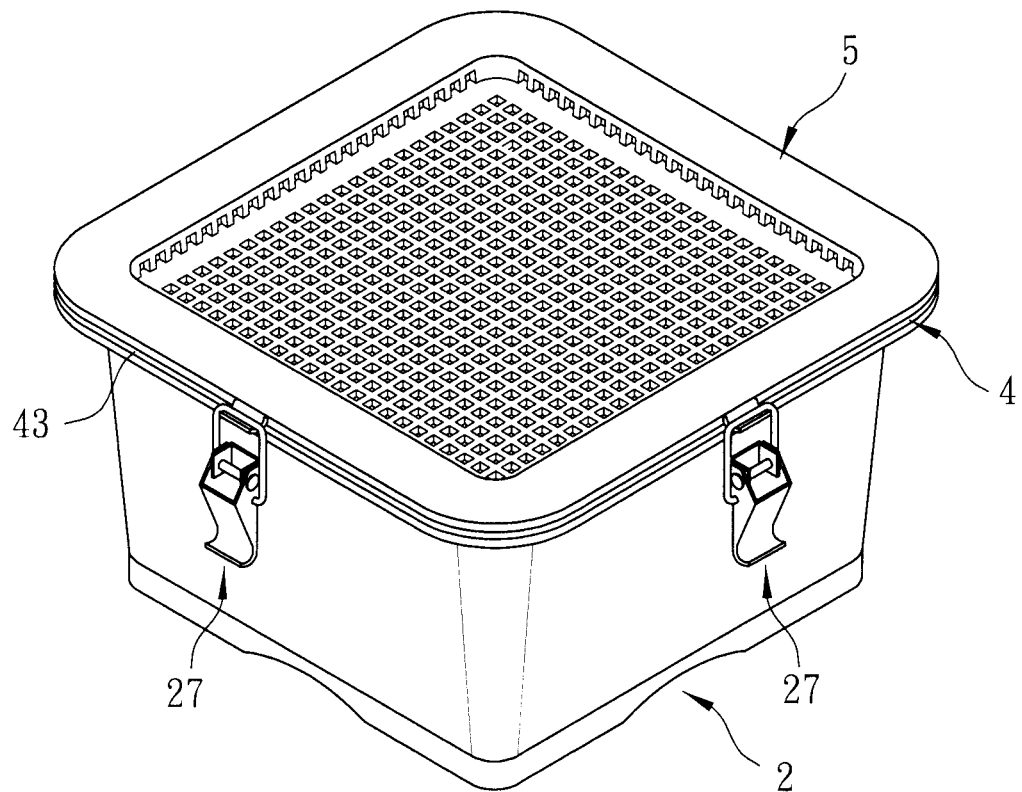
FIG. 11 is a perspective view of a second preferred embodiment of the washing container assembly according to the present invention, in which a bail closure is provided for securing the outer container, the perforated inner container and the lid together.
Figure 12:
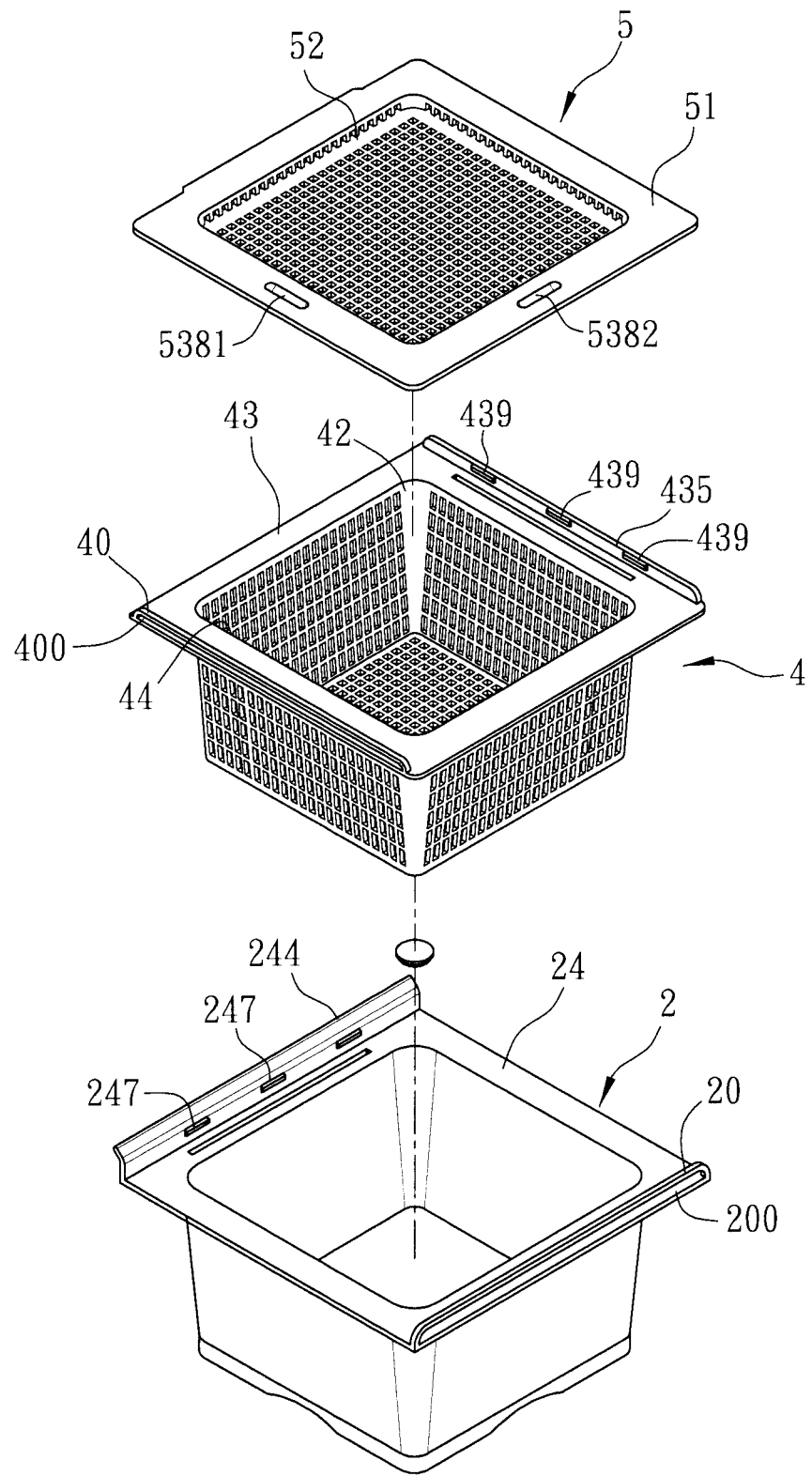
FIG. 12 is an exploded perspective view of a third preferred embodiment of the washing container assembly according to the present invention.
Figure 13:
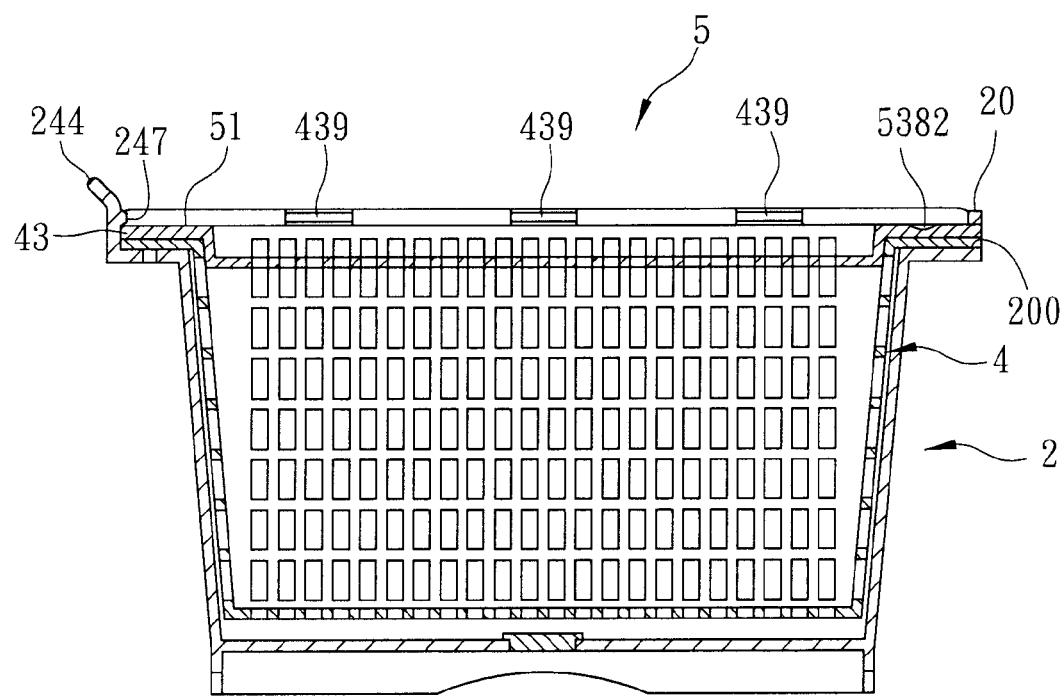
FIG. 13 is a sectional view of the third preferred embodiment, illustrating the lid and the perforated inner container being secured in the outer container.
Figure 14:
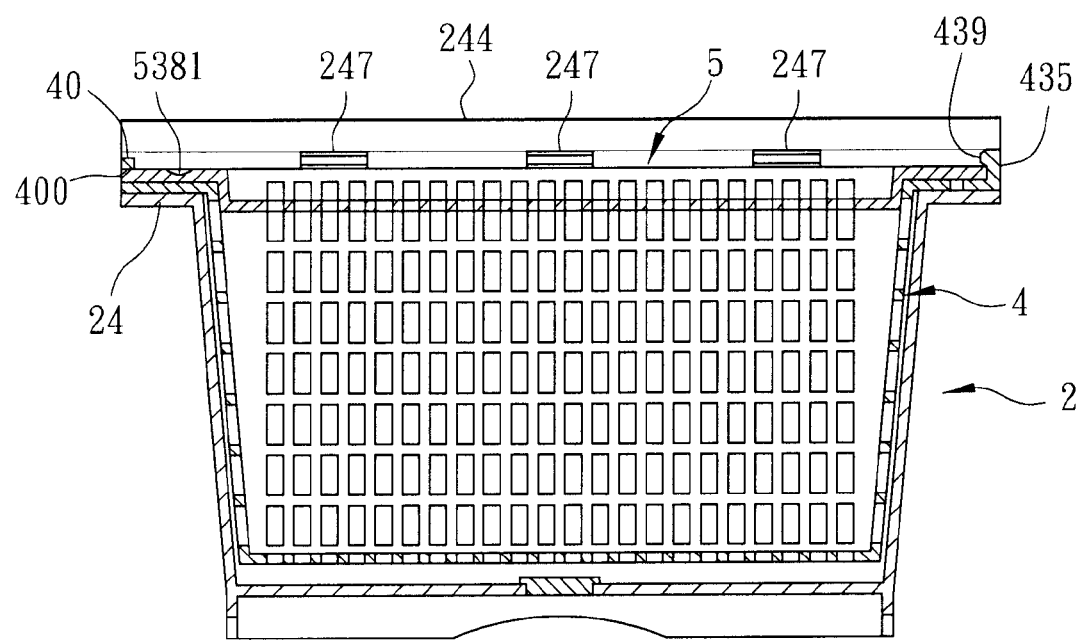
FIG. 14 is another sectional view of the third preferred embodiment.
Figure 15:
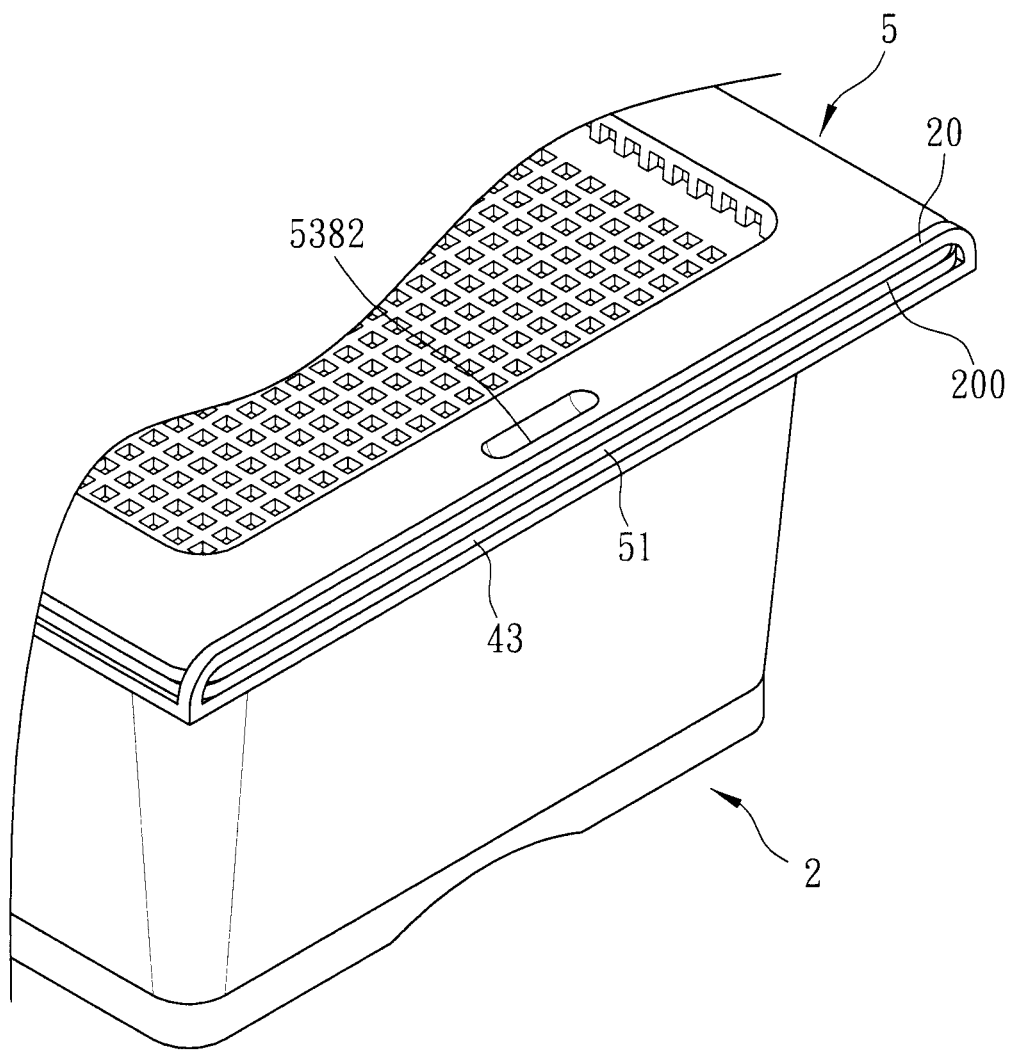
FIG. 15 is a fragmentary perspective view of the third preferred embodiment.
Figure 16:
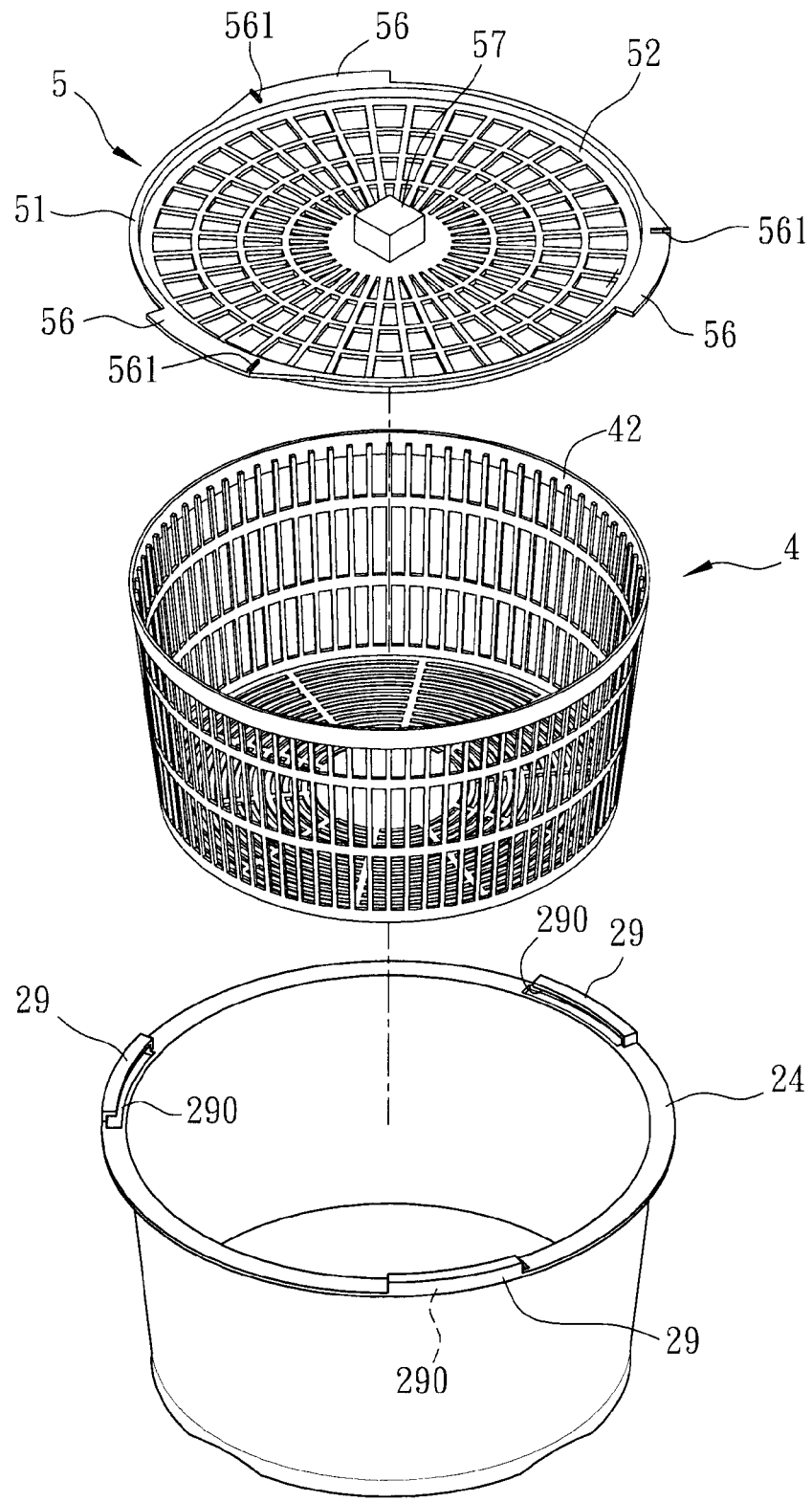
FIG. 16 is an exploded perspective view of a fourth preferred embodiment of the washing container assembly according to the present invention.

Referring to FIG. 11, the second preferred embodiment of the washing container assembly of this invention is shown. In this embodiment, the outer container 2, the perforated inner container 4 and the lid 5 are coupled together via a plurality of bail closures 27.

Referring to FIGS. 12 to 15, the third preferred embodiment of the washing container assembly of this invention is shown. In this embodiment, the flange 43 of the perforated inner container 4 has two pairs of opposite sides respectively formed with a pair of the first attaching members and a pair of the first attaching components. One of the first attaching members is configured as a first hole-defining wall 40 extending from the flange 43 toward the peripheral wall 51 of the lid 5 and defining a first engaging hole 400, and the other one of the first attaching members is configured as a first abutment wall 435 extending from the flange 43 toward the peripheral wall 51.

The flange 24 of the outer container 2 has a pair of opposite sides formed with a pair of the third attaching members. One of the third attaching members is configured as a third hole-defining wall 20 extending from the flange 24 toward the peripheral wall 51 of the lid 5 and defining a third engaging hole 200, and the other one of the third attaching members is configured as a third abutment wall 244 extending from the flange 24 beyond the peripheral wall 51. The peripheral wall 51 of the lid 5 has two pairs of opposite sides respectively has a pair of the second attaching members and a pair second attaching components. The second attaching members engage removably and respectively the first engaging hole 400 and the first abutment wall 435. One of the second attaching components engages removably the third engaging hole 200 and the other one of said second attaching components abuts against the third abutment wall 244.

Note that a plurality of first protrusions 439 and a plurality of third protrusions 247 can be formed on the first abutment wall 435 and the third abutment wall 244, respectively to prevent removal of the lid 5 and the perforated inner container 4 from the outer container 2.

Additionally, the peripheral wall 51 of the lid 5 is formed with two friction portions 5381, 5382 that respectively correspond in position to the first engaging hole 400 and the third engaging hole 200. When it is desired to remove the lid 5 from the perforated inner container 4, the lid 5 is first pushed toward the first abutment wall 435 via the friction portion 5381, such that the lid 5 is bent and one of the second attaching members disengages from the first engaging hole 400, then the other one of the second attaching members disengage from the first abutment wall 411 and the first protrusions 439. Similarly, the lid 5 can also be removed from the outer container 2 by virtue of the friction portion 5382 that enables disengagement of the second attaching components from the third engaging hole 200, the third abutment wall 244 and the third protrusions 247.

Referring to FIGS. 16 to 19, the fourth preferred embodiment of the present invention is shown. In this embodiment, the outer container 2 and the perforated inner container 4 are cylindrical and the lid 5 is circular and the flange 43 of the perforated inner container 4 is omitted.

The third attaching members formed on the flange 24 of the outer container 2 are angularly spaced apart from one another and each of which includes an inverted L-shaped groove-defining wall 29 extending from the flange 24 of the outer container 2 and cooperating with the flange 24 to define an engaging groove 290.

The second attaching components of the lid 5 are angularly spaced apart from one another and each of which is configured as a fin 56 that extends radially and outwardly from the peripheral wall 51 of the lid 5 and that engages removably the engaging groove 290 of a respective one of the third attaching members. The depressed wall 52 of the lid 5 has a center portion formed with an accessible portion 57 that extends away from the second compartment 42 and that is accessible by an user to rotate the lid 5 relative to the outer container 2.

Figure 17:
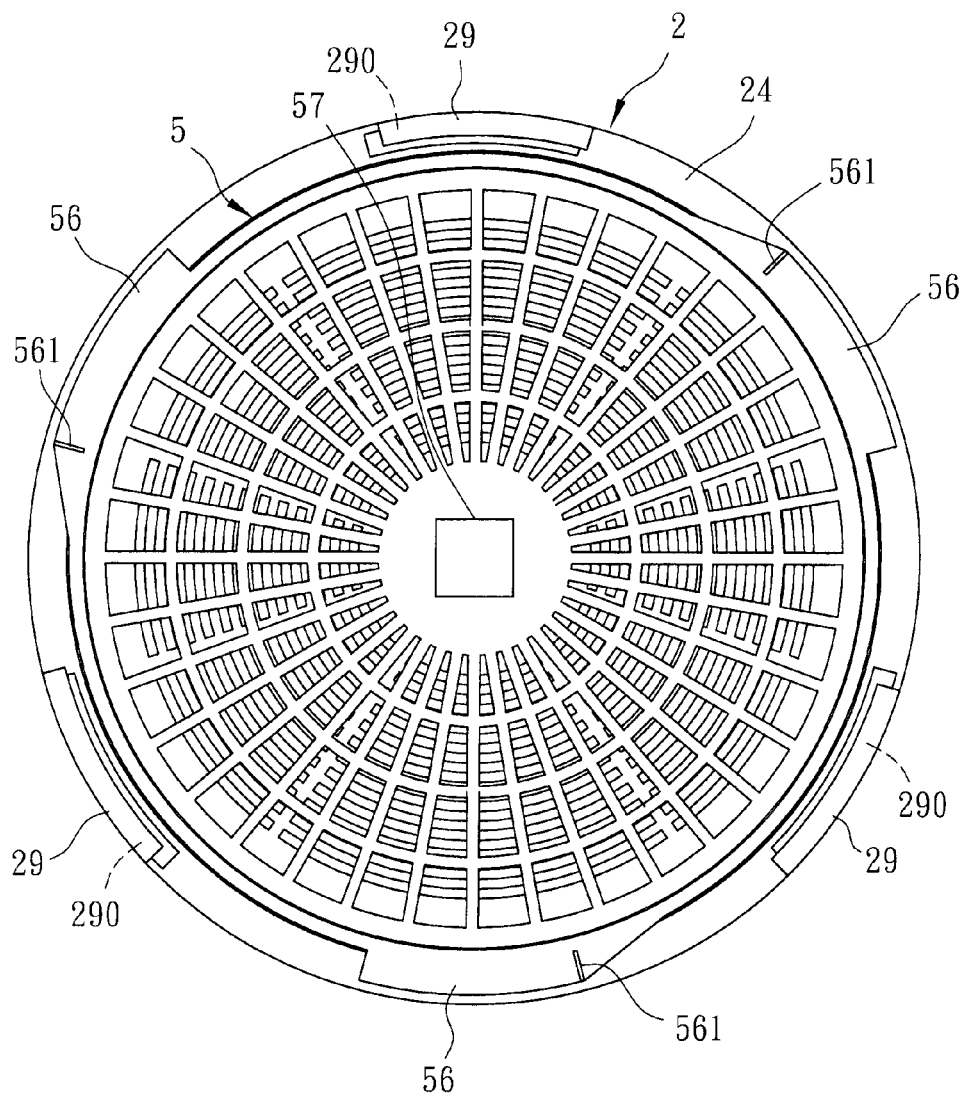
FIG. 17 is a top view of the fourth preferred embodiment, illustrating attaching components formed on the lid misaligned with the attaching members formed on the outer container.
Figure 18:
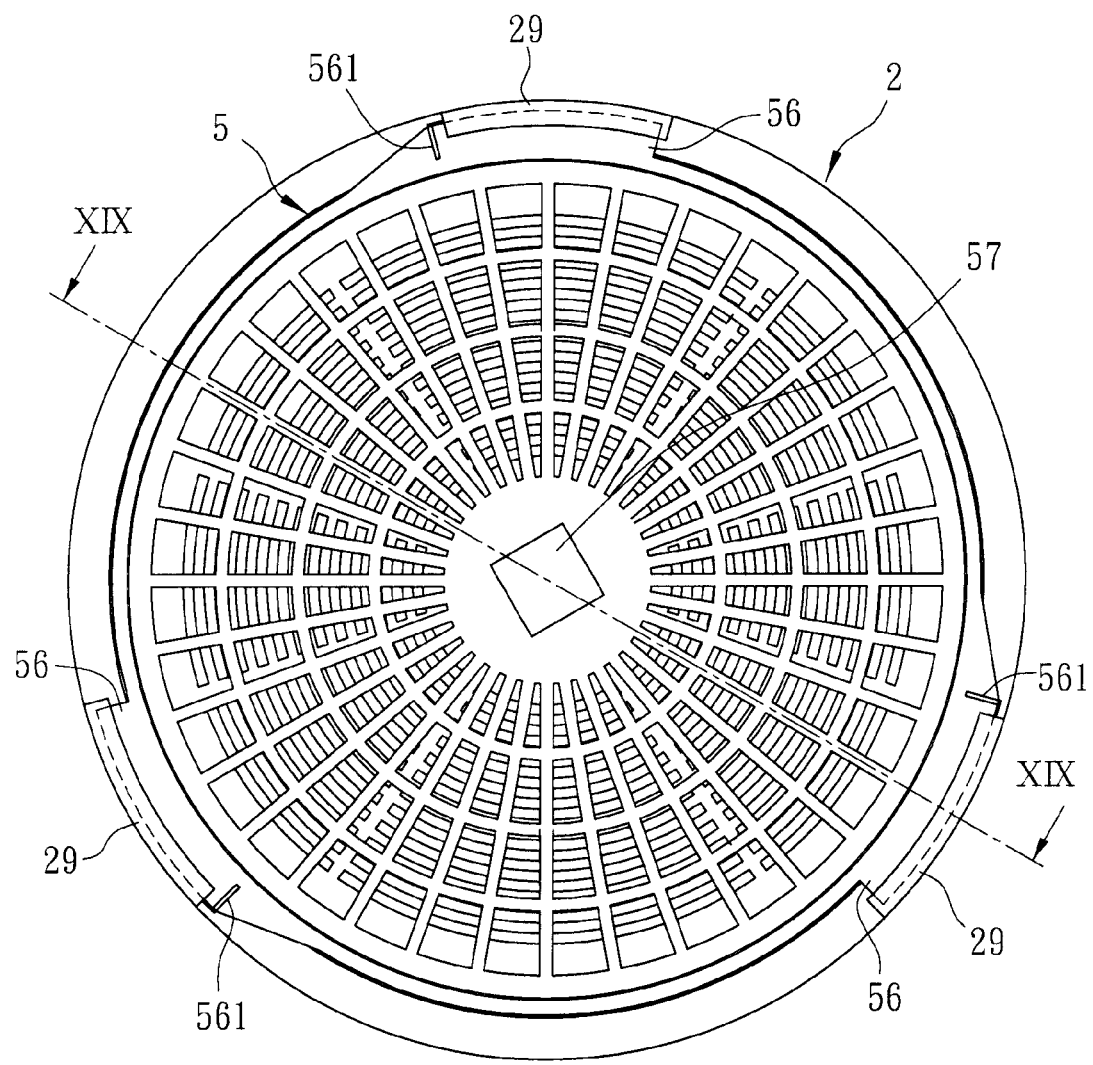
FIG. 18 is another top view of the fourth preferred embodiment, illustrating the lid and the outer container being secured by attaching components formed on the lid and the attaching members formed on the outer container.
Figure 19:
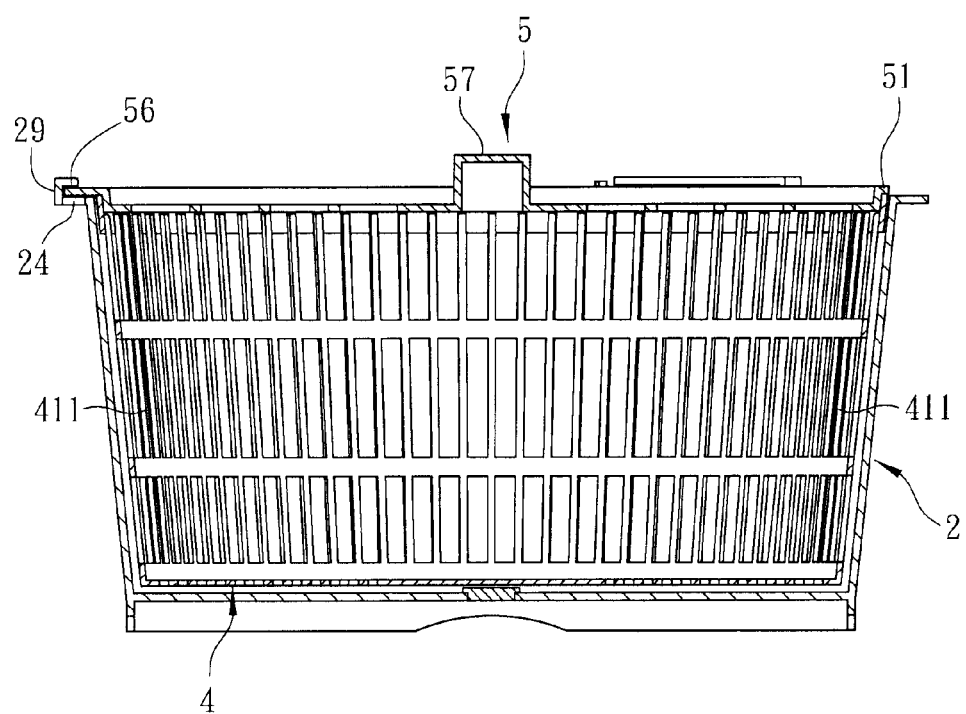
FIG. 19 is a sectional view taken along line XIX-XIX in FIG. 18.

As shown in FIG. 17, the lid 5 is disposed on the flange 24 of the outer container 2 with the fins 56 misaligned with the groove-defining walls 29. Further referring to FIG. 18, to secure the lid 5 to the outer container 2, the lid 5 is rotated relative to the outer container 2 by the accessible portion 57 and the fins 56 are brought to engage the engaging grooves 290, respectively.

Additionally, a plurality of projections 561 may be formed on the respective fins 56. When the fins 56 engage the respective engaging grooves 290, the projections 561 also engage the respective groove-defining walls 29 to enhance engaging strength between the lid 5 and the outer container 2.

Figure 20:
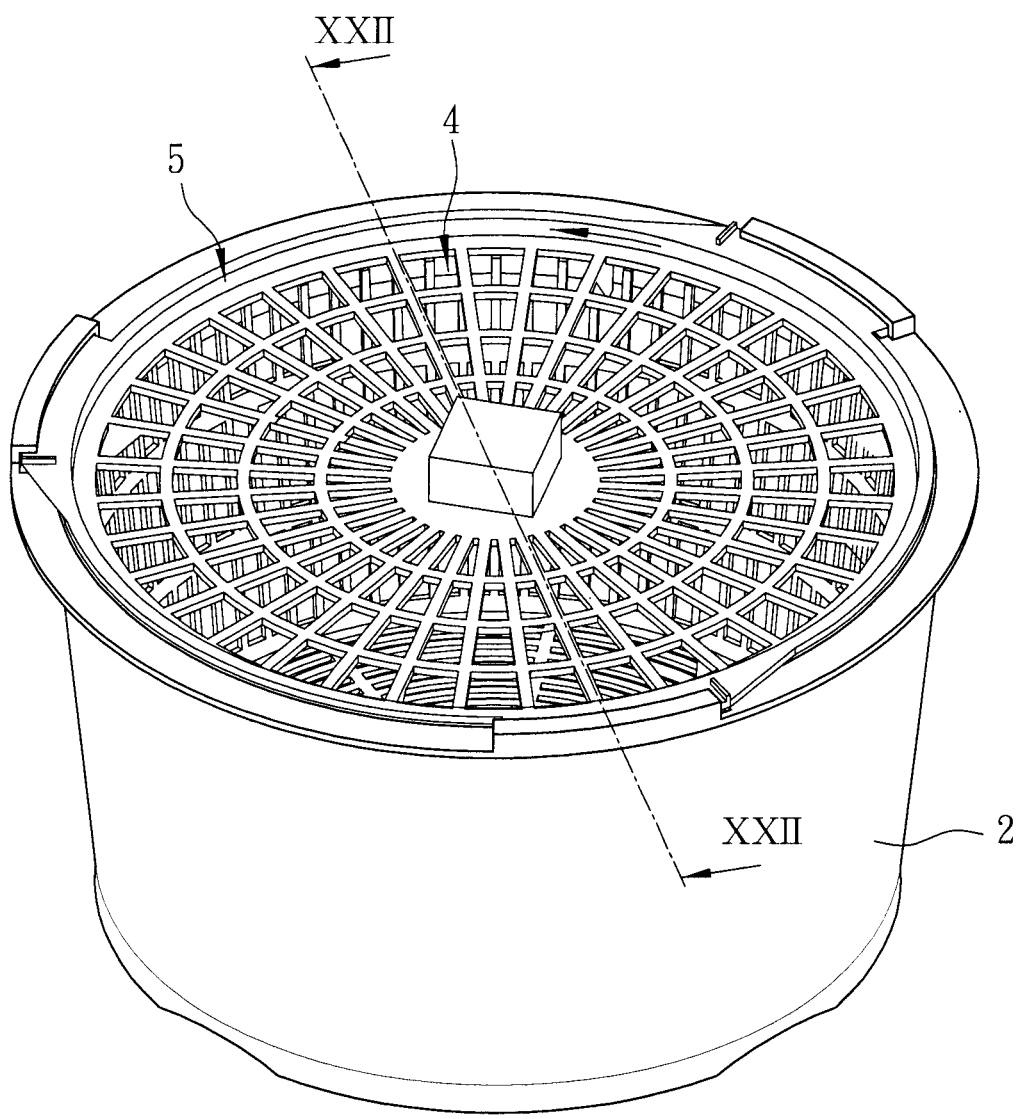
FIG. 20 is a perspective view of a modification of the fourth preferred embodiment.
Figure 21:
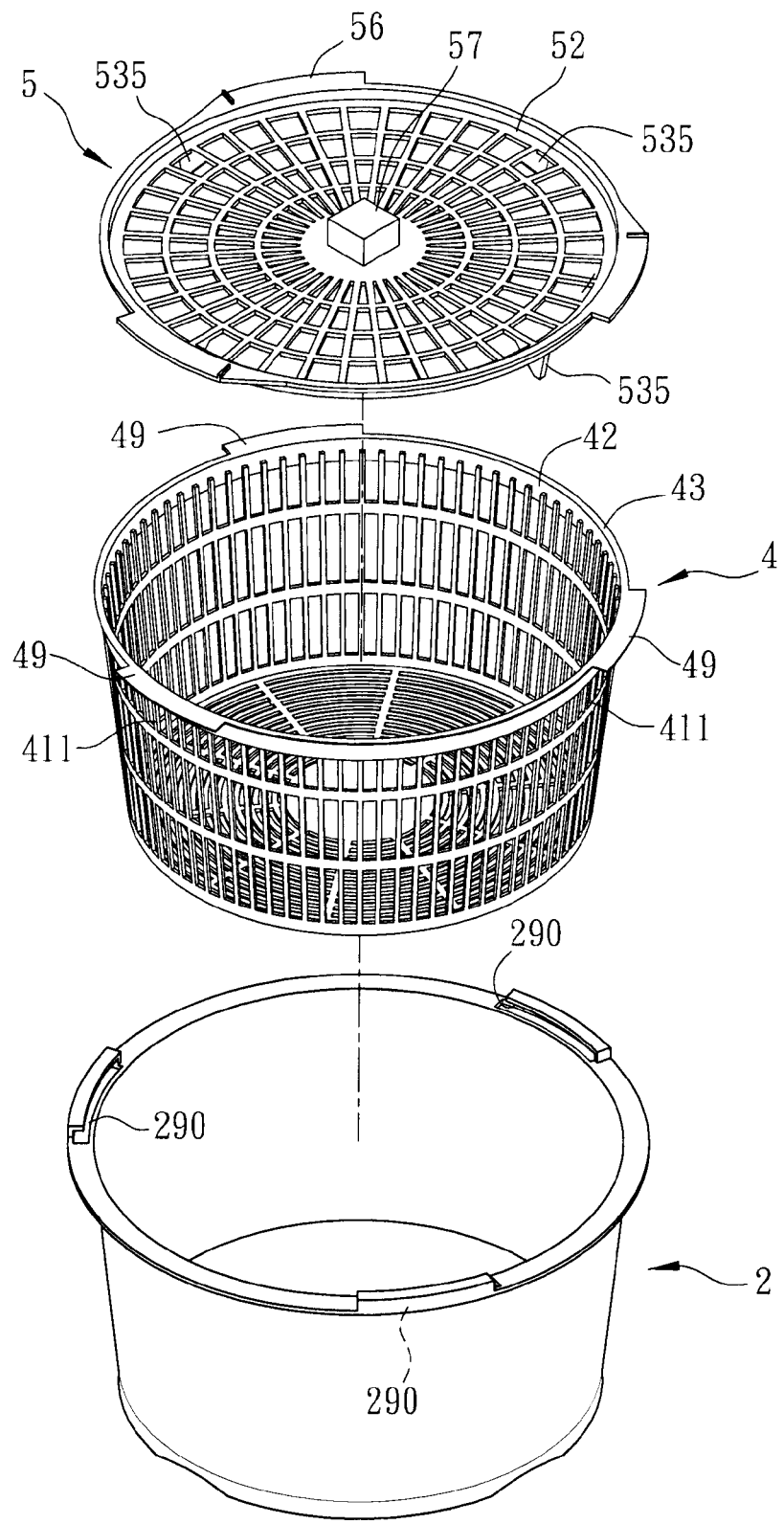
FIG. 21 is an exploded perspective view of the modification of the fourth preferred embodiment, illustrating the perforated inner container formed with a plurality of attaching members for coupling the attaching members formed on the outer container.
Figure 22:
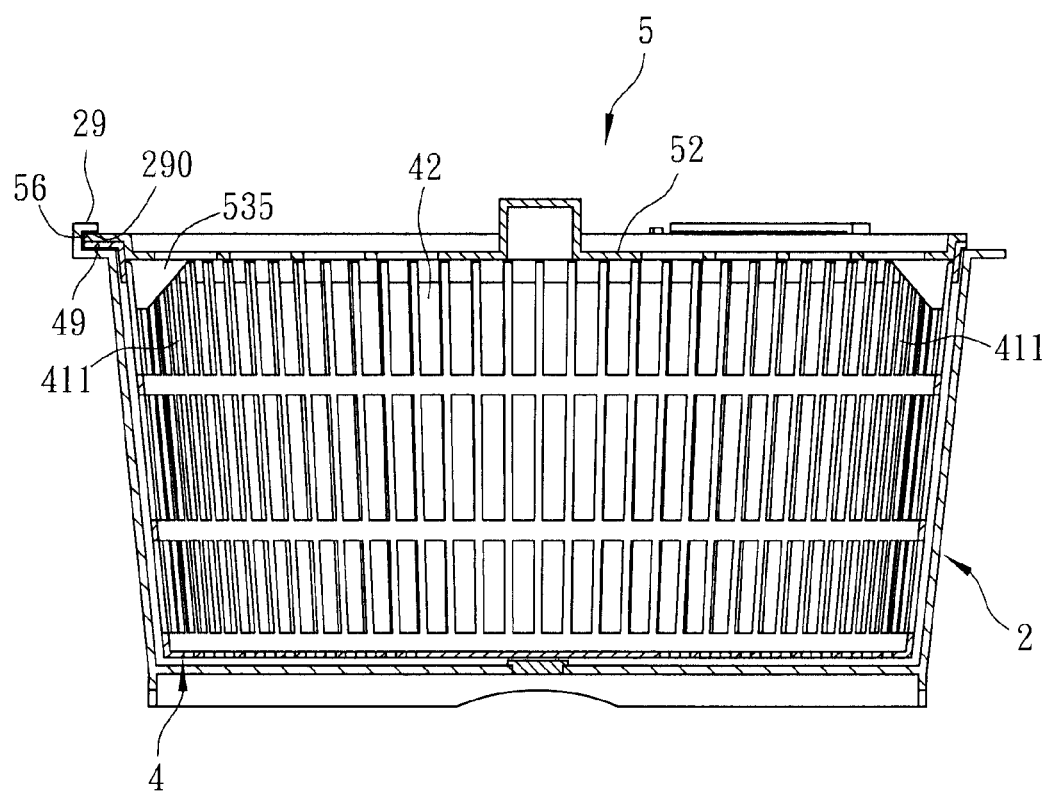
FIG. 22 is a sectional line taken along line XXII-XXII in FIG. 20.
Figure 23:
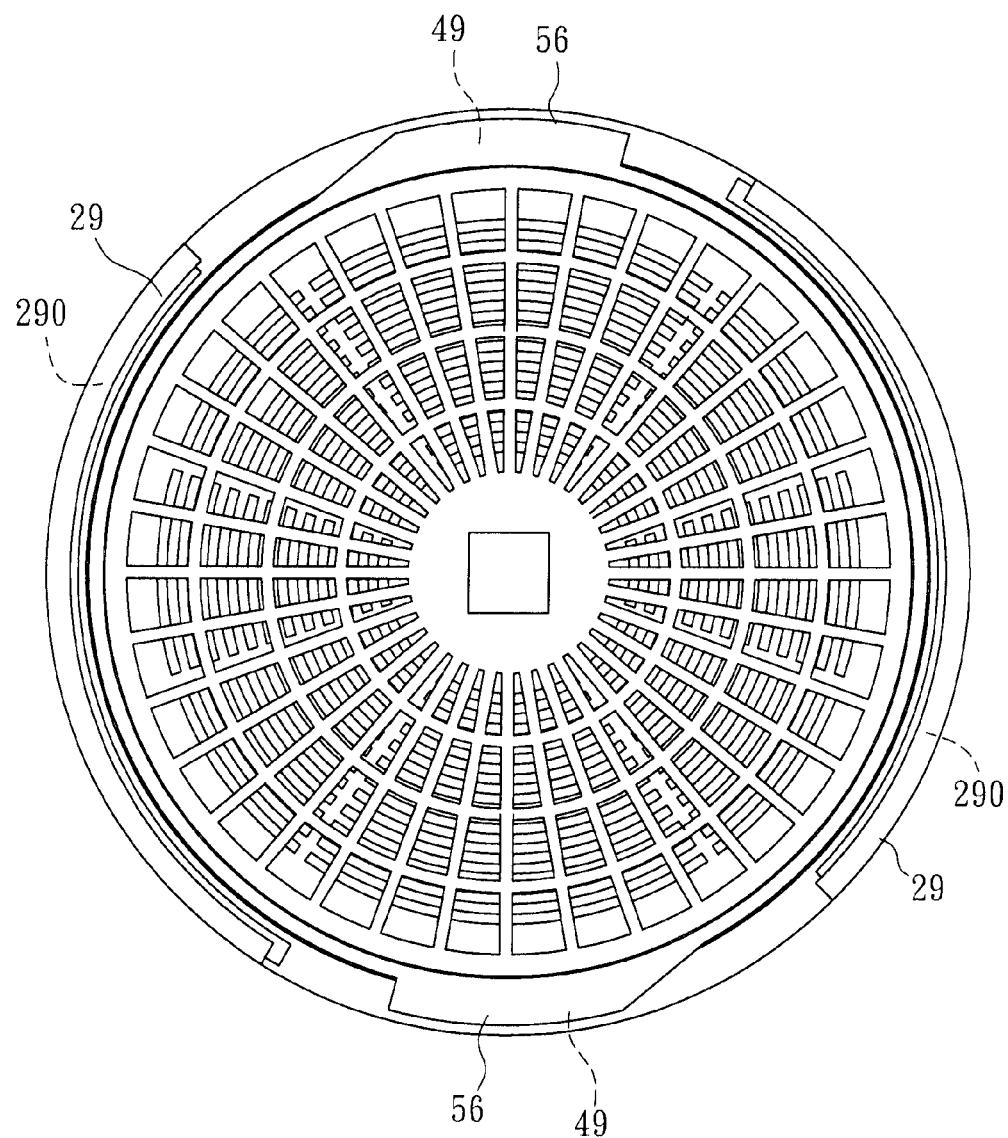
FIG. 23 is another modification of the fourth preferred embodiment, illustrating the number of the attaching components formed on the lid and the attaching members formed on the outer container being two.
Figure 24:
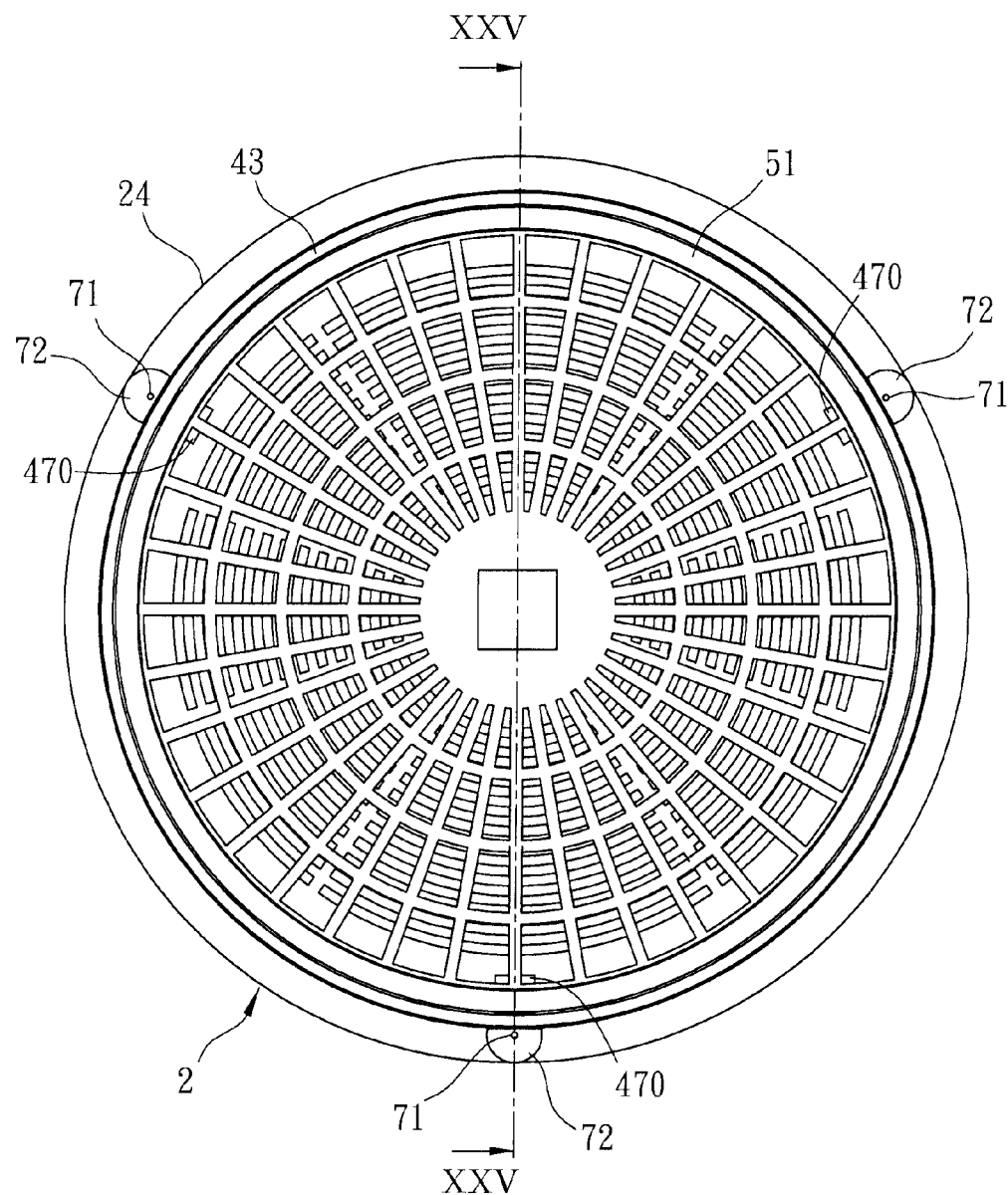
FIG. 24 is a top view of fifth preferred embodiment of the washing container assembly according to the present invention.
Figure 25:
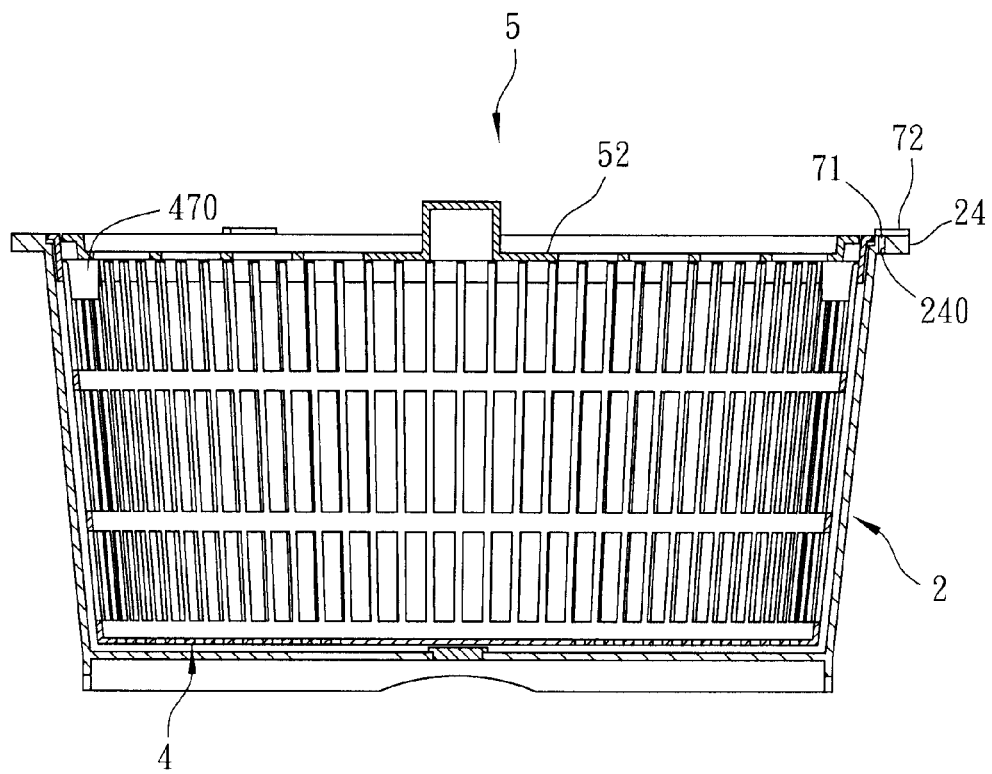
FIG. 25 is a sectional view taken along line XXV-XXV in FIG. 24, illustrating each of the attaching members formed on the outer container configured as a pivot pin and an elongated block pivotable to the outer container.
Figure 26:
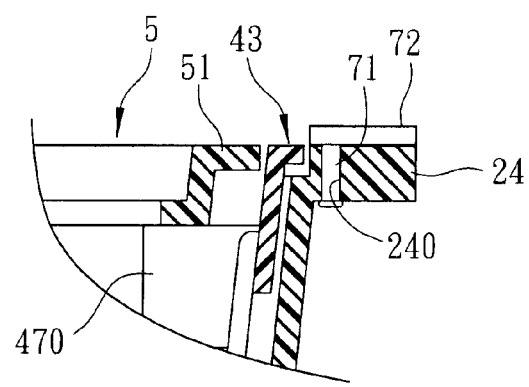
FIG. 26 is a fragmentary enlarged sectional view of the elongated block and the pivot pin of one of the attaching members.

Referring to FIGS. 20 to 22, a modification of the fourth preferred embodiment is shown. The second attaching members formed on the lid 5 are angularly spaced apart from one another and each of which is configured as a second protrusions 535 that extends from the depressed wall 52 into the second compartment 42 and that engage removably one of the through holes 411 of the perforated inner container 4. The perforated inner container 4 in this aspect is formed with the flange 43 disposed between the peripheral wall 51 and the flange 24. The first attaching components formed on the flange 24 are angularly spaced apart from one another. Each of the first attaching components is configured as a fin 49 that extends radially and outwardly from the flange 43, that is co-rotatable with the lid 5 relative to the outer container 2 by virtue of the engagement between the second protrusions 535 and the through holes 411 of the perforated inner container 4, and that engages removably the engaging groove 290 of the respective one of the third attaching members. Note that, as shown in FIG. 23, the number of the fins 49, the fins 56, the groove-defining walls 29 and the engaging grooves 290 may be two, respectively.

Figure 27:
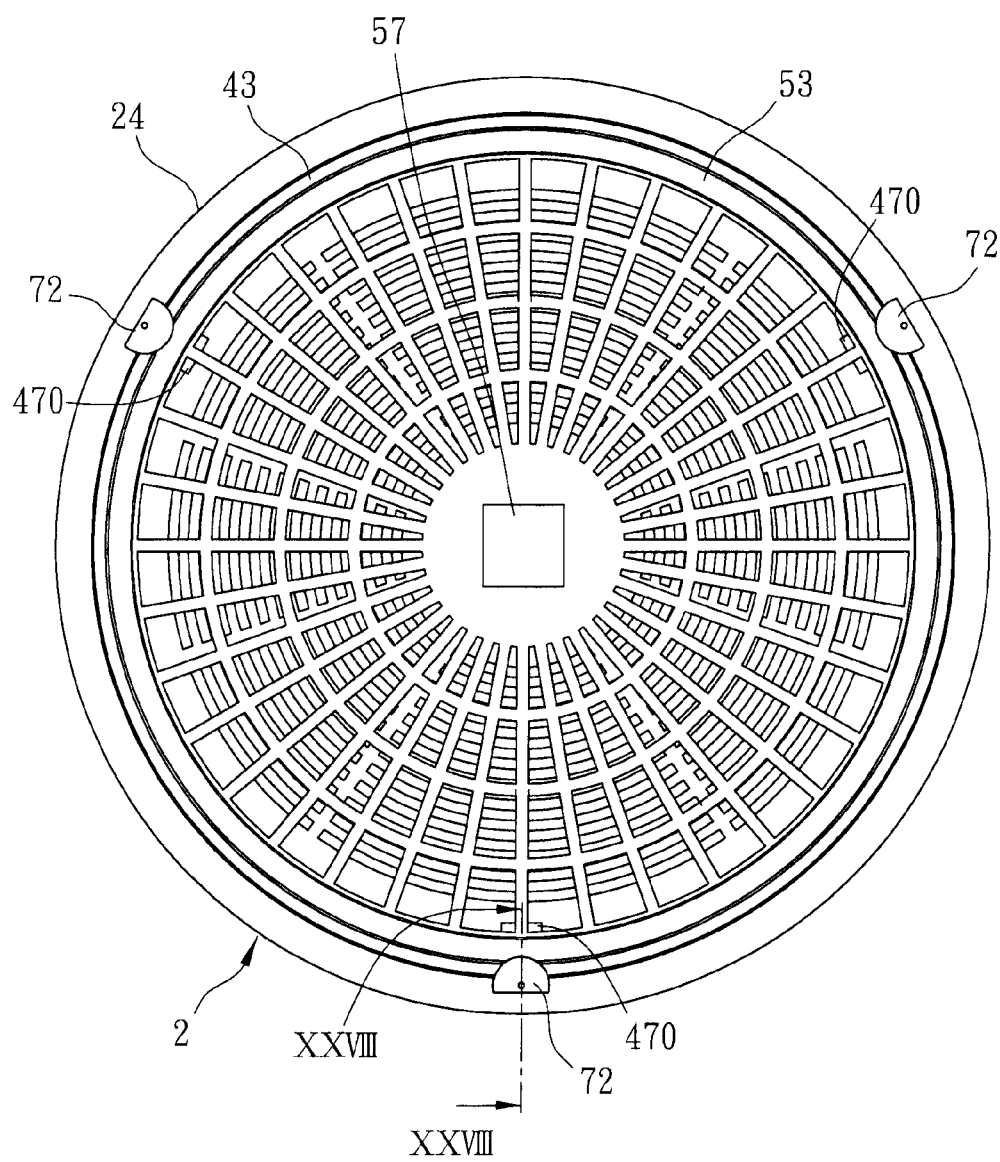
FIG. 27 is another top view of the fifth preferred embodiment, illustrating the elongated blocks secured the lid, the perforated inner container and the outer container together.
Figure 28:
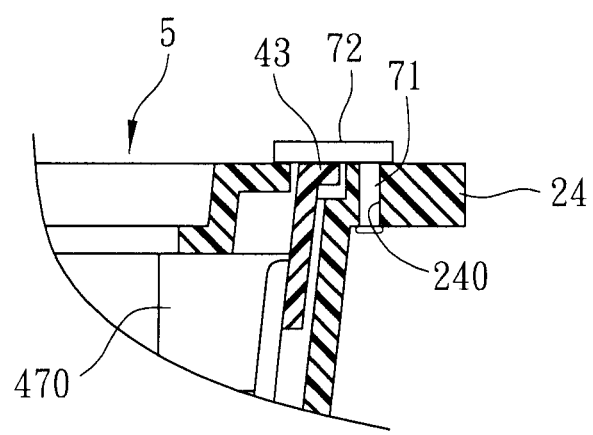
FIG. 28 is a sectional view taken along line XXVIII-XXVIII in FIG. 27.

Referring to FIGS. 24 to 28, the fifth preferred embodiment of the invention similar to the fourth embodiment is shown. In this embodiment, the main portion 41 of the perforated inner container 4 is formed with a plurality of supporting members 470 disposed adjacent to the second top opening 44 to support the depressed wall 52 of the lid 5 thereon. The flange 24 of the outer container 2 is formed with a plurality of pin holes 240 extending therethrough. Each of the third attaching members formed on the flange 24 of the outer container 24 includes a pivot pin 71 extending through a respective one of the pin holes 240 and an elongated block 72 disposed above the flange 43 of the perforated inner container 4, the flange 24 of the outer container 2, and the peripheral wall 51 of the lid 5, being connected fixedly to the pivot pin 71, and being rotatable to lock the peripheral wall 51 of the lid 5 and the flange 43 of the perforated inner container 4 within the flange 24 of the outer container 2. As shown in FIGS. 27 and 28, to secure the lid 5 and the perforated inner container 4 to the outer container 2, the elongated blocks 72 are pivoted to the flange 43 to lock the peripheral wall 51 and the flange 43.

Referring to FIGS. 28 to 34, a modification of the fifth embodiment is shown. In this aspect, the flange 43 of the perforated inner container 4 is formed with a plurality of through holes 430 extending therethrough. Each of the first attaching members formed on the flange 43 of the perforated inner container 4 includes a pivot pin 71 extending through a respective one of the pin holes 240 and an elongated block 72 disposed above the flange 43 of the perforated inner container 4 and the peripheral wall 51 of the lid 5, connected fixedly to the pivot pin 71, and rotatable to lock the peripheral wall 51 when pivoted and the flange 43 of the perforated inner container 4.

Each of the third attaching members formed on the flange 24 of the outer container 2 includes an inverted L-shaped groove-defining wall 246 that extends from the flange 24, and that cooperates with the flange 24 to define an engaging groove 2460 that is to be removably locked by the respective one of the elongated blocks 72.

Figure 29:
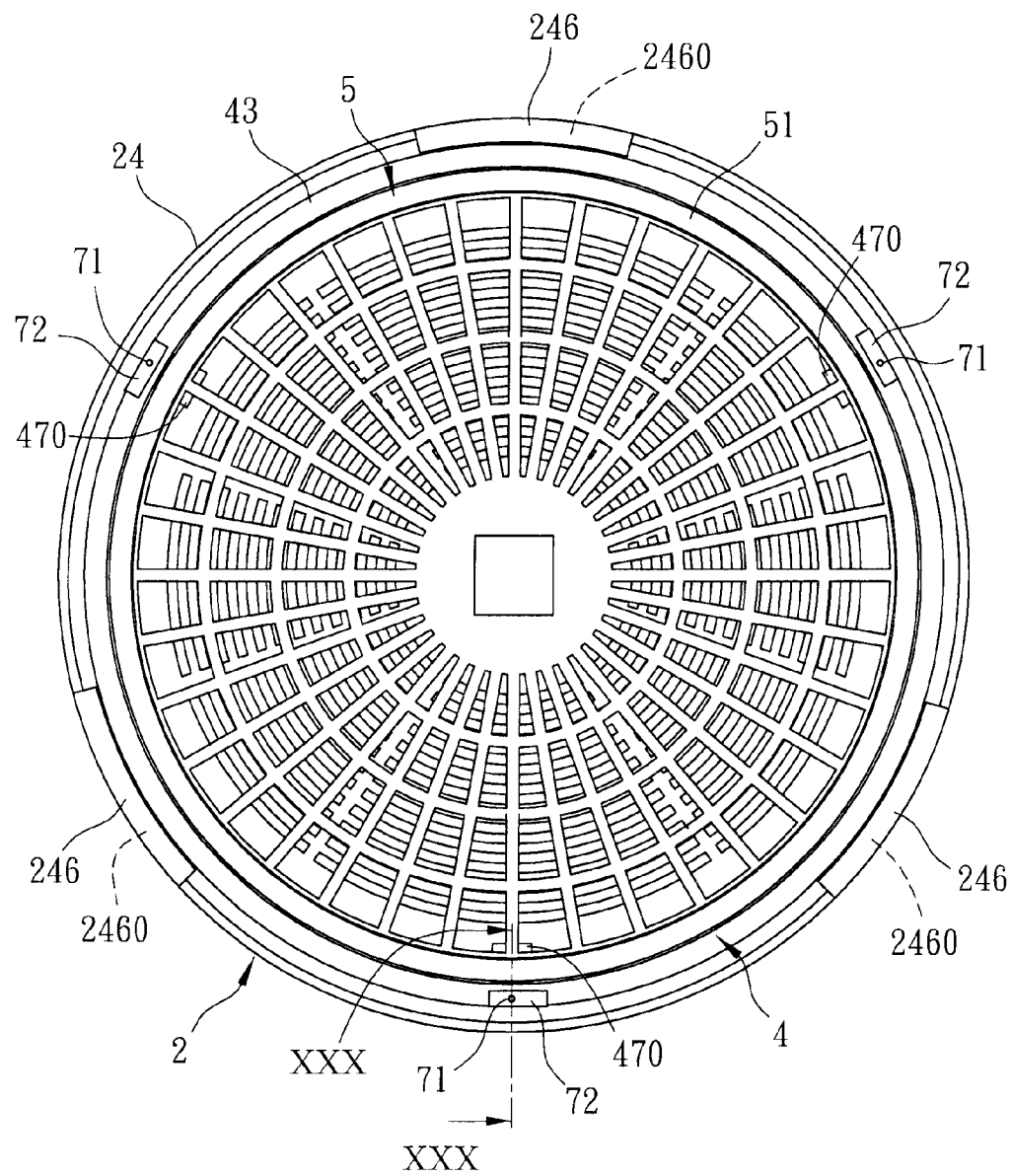
FIG. 29 is a modification of the fifth preferred embodiment.
Figure 30:
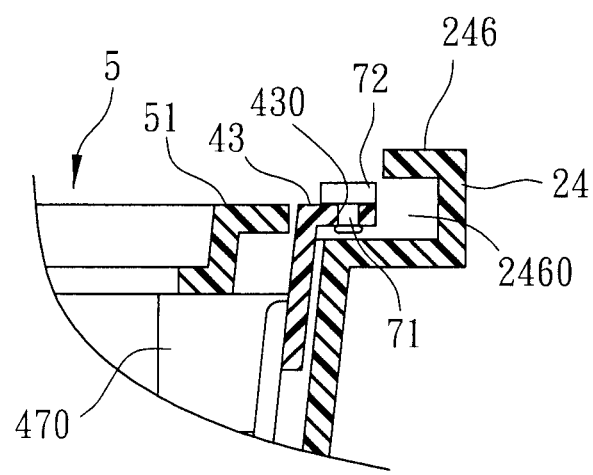
FIG. 30 is a sectional view taken along line XXX-XXX of FIG. 29, illustrating each of the attaching members formed on the flange of the perforated inner container configured as a pivot pin and an elongated block pivotable to the perforated inner container.
Figure 31:
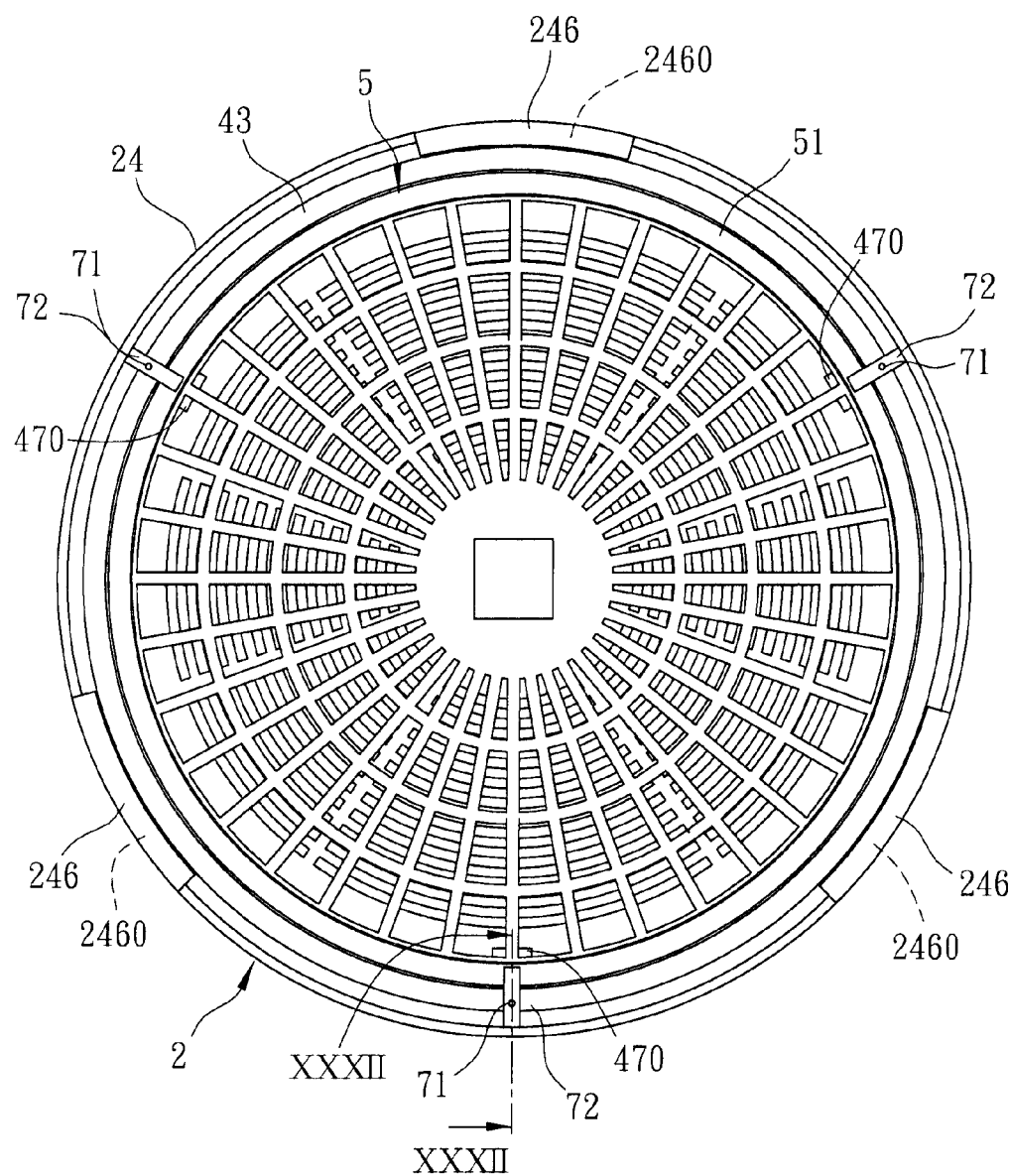
FIG. 31 is another top view of the modification of the fifth preferred embodiment, illustrating the elongated blocks pivoted to the perforated inner container.
Figure 32:
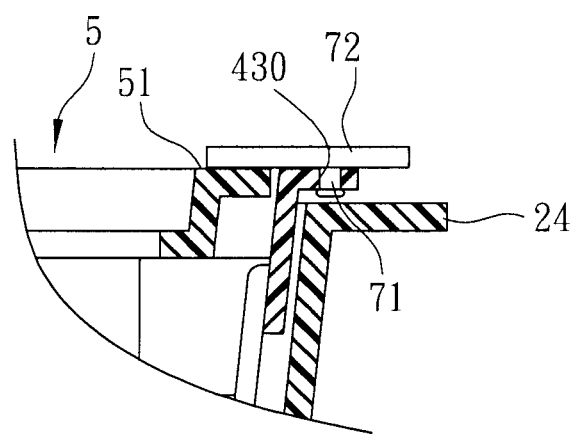
FIG. 32 is a sectional view taken along line XXXII-XXXII in FIG. 31, illustrating the elongated blocks secured the lid and the perforated inner container together.
Figure 33:
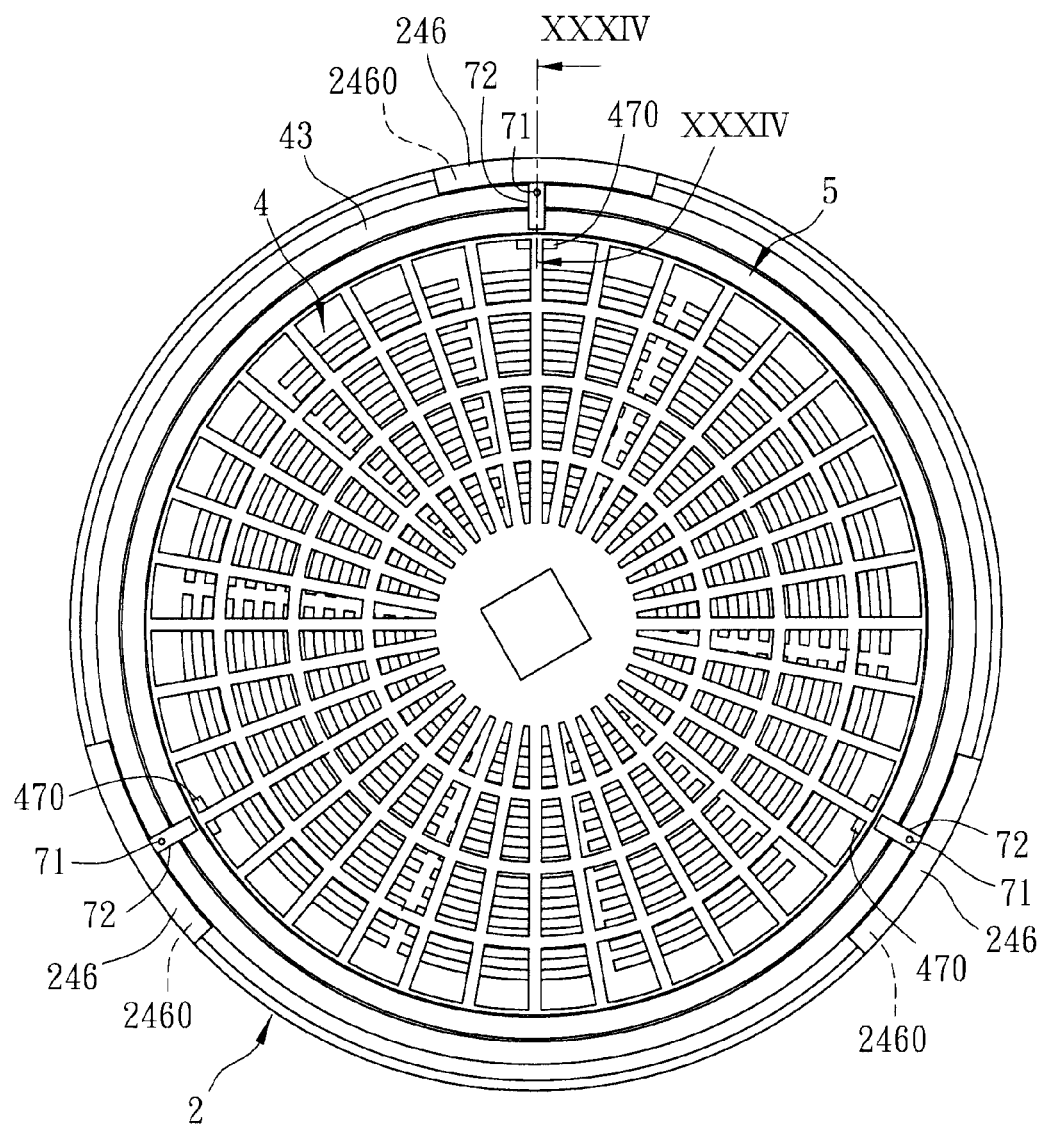
FIG. 33 is another top view of the modification of the fifth preferred embodiment, illustrating the lid and the perforated inner container rotated relative to the outer container.
Figure 34:
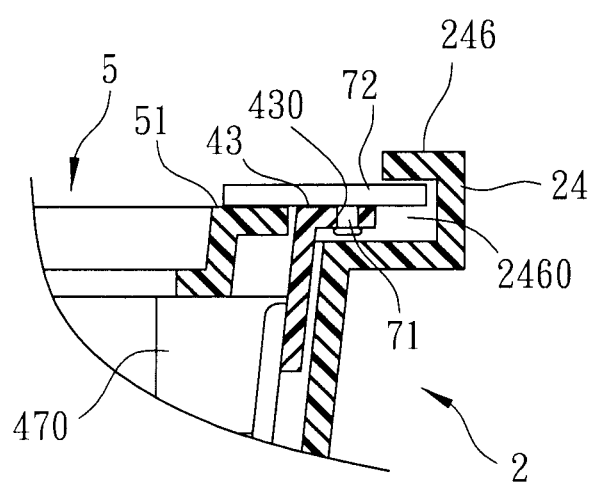
FIG. 34 is a sectional vies taken along line XXXIV-XXXIV in FIG. 33, illustrating the attaching members formed on the outer container secured the outer container, the perforated inner container and the lid together.

As shown in FIGS. 28 to 30, the elongated blocks 72 do not lock the peripheral wall 51 and the engaging grooves 2460. Referring to FIGS. 31 and 32, the elongated blocks 72 are rotated relative to the flange 43 so as to lock the peripheral wall 51 of the lid 5 to the perforated inner container 4. Hereafter, as shown in FIGS. 33 and 34, an assembly of the perforated inner container 4 and the lid 5 is rotated relative to the outer container 2, thus the elongated blocks 72 are brought to engage and lock the engaging grooves 2460.

Figure 35:
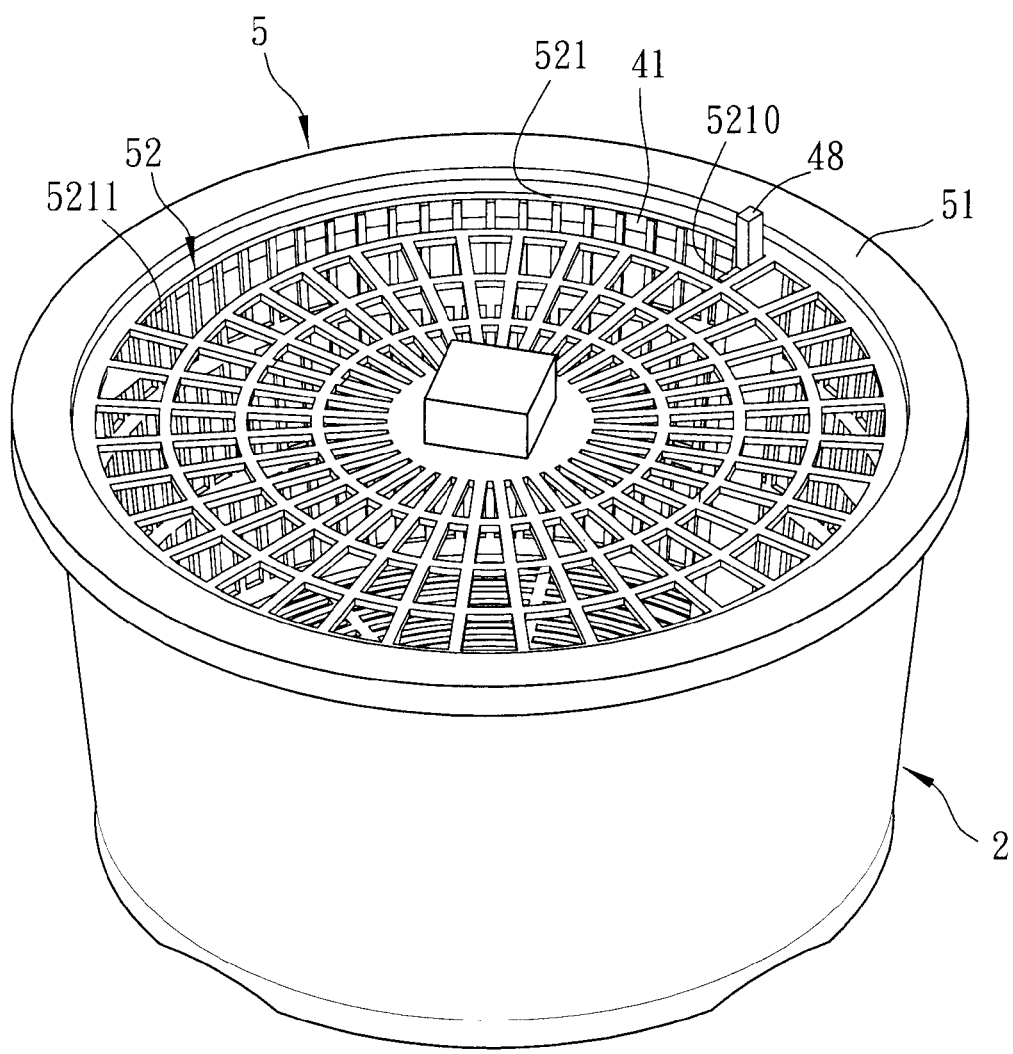
FIG. 35 is a sixth preferred embodiment of the washing container assembly according to the present invention, in which the attaching members formed on the outer container are made of flexible material.
Figure 36:
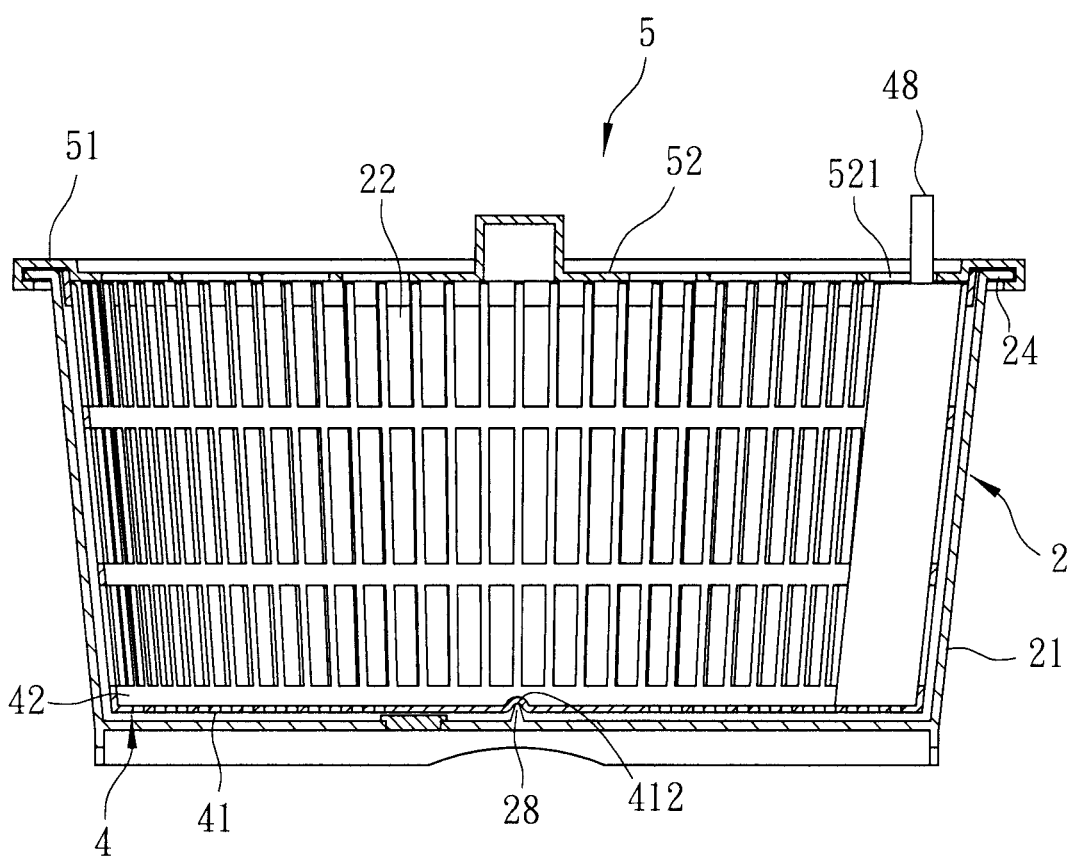
FIG. 36 is a sectional view taken along line XXXVI-XXXVI in FIG. 35, illustrating the lid and the outer container being secured by the attaching members.

Referring to FIGS. 35 and 36, the sixth preferred embodiment of the present invention is shown. In this embodiment, the second attaching component formed on the peripheral wall 51 of the lid 5 is made of a flexible material, is configured to have a hook-shaped cross-section, and extends from the peripheral wall 51 to surround the flange 24 of the outer container 2. Note that the flange 43 of the perforated inner container 4 is omitted in this embodiment.

The depressed wall 52 of the lid 5 is formed with an arc-shaped guiding slot 521 extending along a circumferential direction of the lid 5 and having opposite first and second ends 5210, 5211 that are angularly spaced apart from each other.

The perforated inner container 4 has a recessed portion 412 and an accessible operating portion 48. The recessed portion 412 is formed in center of a bottom part of the main portion 41 and that projects into the second compartment 42. The accessible operating portion 48 extends from the main portion 41 of the perforated inner container 4 through the guiding slot 521 and is movable between the first and second ends 5210, 5211 of the guiding slot 521 for driving rotation of the perforated inner container 4.

The main portion 21 of the outer container 2 has a bottom part formed with a protrusion 28 that extends toward and abuts against the recessed portion 412 of the perforated inner container 4, and that has a length longer than a depth of the recessed portion 412 such that the remaining portions of the bottom part of the outer container 2 is spaced apart from the perforated inner container 4. When the operating portion 48 of the perforated inner container 4 is movable between the first and second ends 5210, 5211 of the guiding slot 521, the perforated inner container 4 rotates relative to the outer container 2 to generate water flow that facilitates washing of the articles 9.

Figure 37:
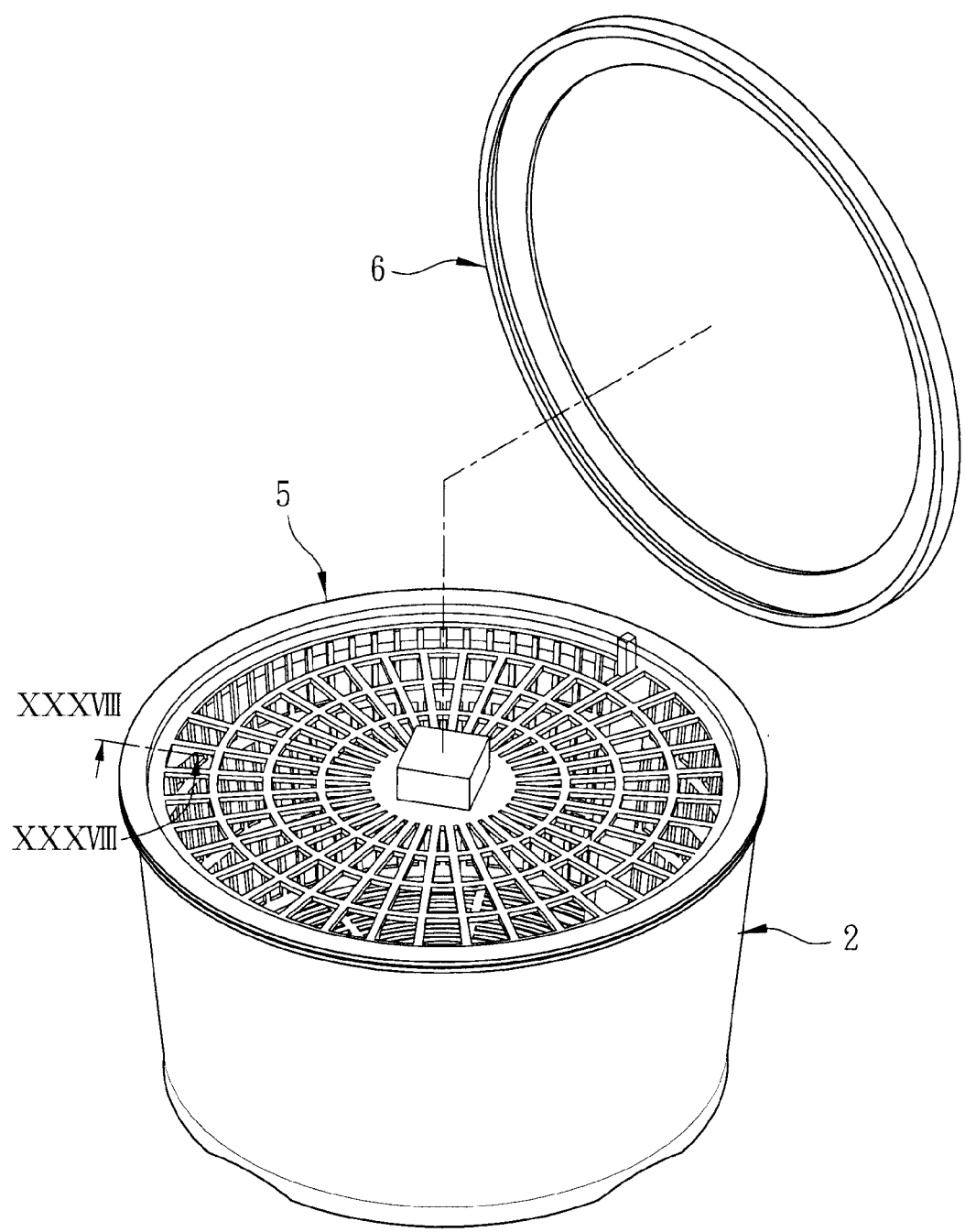
FIG. 37 is a modification of the sixth preferred embodiment, in which the attaching members are configured as a flexible ring separated from the outer container.
Figure 38:
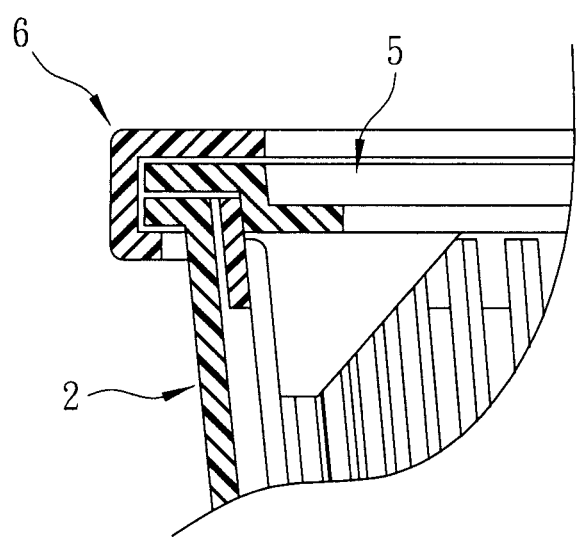
FIG. 38 is a sectional view of the modification of the sixth preferred embodiment, illustrating the attaching members coupling the lid to the outer container.

Note that, as shown in FIGS. 37 and 38, the second attaching components can be separated from the outer container and configured as a flexible ring 6 that couples the lid 5 to the outer container 2 in a modification of the sixth preferred embodiment.

To sum up, some of the advantages of the present invention are as follows. By virtue of the depressed wall 52 of the lid 5, the articles 9 being washed can be maintained in the second compartment 42 and immersed in water in the second compartment 42. Additionally, the configuration of the valve 3 and the through holes 521 formed in the depressed wall 52 make it possible to reuse water in the outer container 2 for washing other articles, which is environmental friendly.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A washing container assembly for washing an article, said washing container assembly comprising:
   an outer container having a top portion that defines a first top opening and defining a first compartment that is in spatial communication with said first top opening;
   a perforated inner container having a top portion that defines a second top opening, coupled removably to said outer container, and defining a second compartment that is within said first compartment, that is in spatial communication with said second top opening, and that is adapted for receiving the article therein;
   a perforated and dish-shaped lid including
      a peripheral wall that is connected removably to said first and second top openings of said outer and inner containers, and
      a depressed wall that extends from said peripheral wall into said second compartment and that is adapted for maintaining the article in said second compartment;
   said outer container and said perforated inner container are cylindrical and said lid is circular;
   said perforated inner container has a main portion formed with a plurality of through holes and a plurality of supporting members disposed adjacent to said second top opening to support said depressed wall of said lid thereon, said top portion of said perforated inner container being configured as a flange that protrudes from a top end of said main portion away from said second top opening, and that is formed with at least one pin hole extending therethrough and at least one first attaching member including
      a pivot pin that extends rotatably through said pin hole, and
      an elongated block that is disposed above said flange of said perforated inner container and said peripheral wall of said lid, that is connected fixedly to said pivot pin, and that is rotatable to lock said peripheral wall of said lid and said flange of said perforated inner container; and
   said outer container has a main portion that defines said first compartment and that receives said main portion of said perforated inner container and said lid therein, said top portion of said outer container being configured as a flange that protrudes radially from a top end of said main portion of said outer container away from said first top opening, that is disposed under said flange of said perforated inner container, and that is formed with at least one third attaching member, said at least one third attaching member including an inverted L-shaped groove-defining wall that extends from said flange of said outer container beyond said elongated block, and that cooperates with said flange of said outer container to define an engaging groove that is to be removably locked by said elongated block.

* * * * *